(12) United States Patent
Muratani

(10) Patent No.: US 7,667,900 B2
(45) Date of Patent: Feb. 23, 2010

(54) ZOOM LENS SYSTEM AND OPTICAL APPARATUS USING THE SAME

(75) Inventor: Mami Muratani, Tokyo (JP)

(73) Assignee: Nikon Corporation, Tokyo (JP)

( * ) Notice: Subject to any disclaimer, the term of this patent is extended or adjusted under 35 U.S.C. 154(b) by 6 days.

(21) Appl. No.: 12/023,066

(22) Filed: Jan. 31, 2008

(65) Prior Publication Data

US 2008/0212202 A1 Sep. 4, 2008

(30) Foreign Application Priority Data

Feb. 16, 2007 (JP) .............................. 2007-036794

(51) Int. Cl.
*G02B 15/14* (2006.01)

(52) U.S. Cl. ..................... 359/691; 359/708; 359/733; 359/793

(58) Field of Classification Search ................. 359/691, 359/708, 733, 793
See application file for complete search history.

(56) References Cited

U.S. PATENT DOCUMENTS

| | | | |
|---|---|---|---|
| 4,993,814 A | 2/1991 | Hata | |
| 5,283,693 A | 2/1994 | Kohno et al. | |
| 5,446,592 A | 8/1995 | Kohno et al. | |
| 6,025,961 A | 2/2000 | Kohno et al. | |
| 6,124,987 A | 9/2000 | Kayanuma et al. | |
| 2005/0200972 A1* | 9/2005 | Nose et al. | 359/689 |
| 2006/0023319 A1 | 2/2006 | Terada et al. | |
| 2006/0103946 A1* | 5/2006 | Nagai et al. | 359/680 |
| 2006/0274427 A1 | 12/2006 | Wantanabe | |

FOREIGN PATENT DOCUMENTS

| | | | |
|---|---|---|---|
| JP | 8-122638 A | 5/1996 |
| JP | 9-33809 A | 2/1997 |
| JP | 9-311273 A | 12/1997 |
| JP | 2000-9997 A | 1/2000 |
| JP | 2001-215407 A | 8/2001 |
| JP | 2003-131128 A | 5/2003 |
| JP | 2006-039180 A | 2/2006 |
| JP | 2006-171429 A | 6/2006 |

\* cited by examiner

*Primary Examiner*—Joseph Martinez
(74) *Attorney, Agent, or Firm*—Miles & Stockbridge P.C.

(57) ABSTRACT

Providing a zoom lens system excellently correcting various aberrations with accomplishing to be compact, lightweight, and slim upon being accommodated, and to provide an optical apparatus using the zoom lens system. The system consists of, in order from an object, a first group G1 having negative power, a second group G2 having positive power. Upon zooming from a wide-angle end W to a telephoto end T, a distance between the first group G1 and the second group G2 decreases. The first group G1 consists of, in order from the object, a first lens L1 having negative power and a second lens L2 having positive power. The second group G2 consists of, in order from the object, a third lens L3 having positive power, a fourth lens L4 having negative power, and a fifth lens L5 having positive power. Given conditions are satisfied.

27 Claims, 26 Drawing Sheets

ZOOM LENS SYSTEM AND OPTICAL APPARATUS USING THE SAME

The disclosure of the following priority application is herein incorporated by reference:

Japanese Patent Application No. 2007-036794 filed on Feb. 16, 2007.

BACKGROUND OF THE INVENTION

1. Field of the Invention

The present invention relates to a zoom lens system and an optical apparatus using the zoom lens system.

2. Related Background Art

With increasing miniaturizing trend of a digital camera, an optical system loaded thereon has strongly been required to be compact and lightweight to increase portability. With increasing integration of a solid-state imaging device, there has been required a zoom lens system capable of providing high contrast with respect to a higher spatial frequency. There has been proposed a negative-leading zoom lens system suitable for a compact digital camera using such a solid-state imaging device in Japanese Patent Application Laid-Open No. 2000-9997.

However, in the zoom lens system disclosed in Japanese Patent Application Laid-Open No. 2000-9997, the thickness of each lens composing the zoom lens system has six lenses and is relatively large, so that it becomes difficult to accomplish to be compact, lightweight, and slim when the zoom lens system is accommodated in a camera body.

SUMMARY OF THE INVENTION

The present invention is made in view of the aforementioned problems and has an object to provide a zoom lens system excellently correcting various aberrations with accomplishing to be compact, lightweight, and slim upon being accommodated, and to provide an optical apparatus using the zoom lens system.

According to a first aspect of the present invention, there is provided a zoom lens system consisting of, in order from an object: a first lens group having negative refractive power; a second lens group having positive refractive power; upon varying a state of lens group positions from a wide-angle end state to a telephoto end state, a distance between the first lens group and the second lens group decreasing, the first lens group consisting of, in order from the object, a first lens having negative refractive power and a second lens having positive refractive power, the second lens group consisting of, in order from the object, a third lens having positive refractive power, a fourth lens having negative refractive power, and a fifth lens having positive refractive power, and the following conditional expression (1) being satisfied:

$$0.76 < S2/fw < 1.30 \tag{1}$$

where S2 denotes a thickness of the second lens group, and fw denotes a focal length of the zoom lens system in the wide-angle end state.

In the first aspect of the present invention, it is preferable that the first lens has at least one aspherical surface.

In the first-aspect of the present invention, it is preferable that the aspherical surface is disposed at least on an image side surface of the first lens.

In the first aspect of the present invention, it is preferable that the third lens, the fourth lens, and the fifth lens are disposed with respective air spaces in between.

In the first aspect of the present invention, the aspherical surface preferably satisfies the following conditional expression (2):

$$0.10 < \Delta sag/fw < 0.50 \tag{2}$$

where $\Delta sag = XS(h) - X(h)$, in which sag amounts $XS(h)$ and $X(h)$ are denoted by the following spherical expression $XS(h)$ and aspherical expression $X(h)$ upon $y = h = 0.85r$:

$$XS(y) = y^2/[r \times \{1 + (1 - y^2/r^2)^{1/2}\}]$$

$$X(y) = y^2/[r \times \{1 + (1 - K \times y^2/r^2)^{1/2}\}] + C4 \times y^4 + C6 \times y^6 + C8 \times y^8 + C10 \times y^{10}$$

where y denotes a vertical height from the optical axis, $X(y)$ denotes a sag amount which is a distance along the optical axis from the tangent surface at the vertex of the aspherical surface to the aspherical surface at the vertical height y from the optical axis, $XS(y)$ denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order, and where $X(y)$ and $XS(y)$ are positive toward the image.

In the first aspect of the present invention, the following conditional expression (3) is preferably satisfied:

$$1.05 < FNw \times fw/(-f1) < 1.85 \tag{3}$$

where FNw denotes an f-number of the zoom lens system in the wide-angle end state, fw denotes a focal length of the zoom lens system in the wide-angle end state, and f1 denotes a focal length of the first lens group.

In the first aspect of the present invention, the following conditional expression (4) is preferably satisfied:

$$1.85 < Z \times S1/S2 < 5.00 \tag{4}$$

where S1 denotes a thickness of the first lens group, S2 denotes a thickness of the second lens group, and Z denotes a zoom ratio of the zoom lens system.

In the first aspect of the present invention, the following conditional expression (5) is preferably satisfied:

$$-2.5 < G2\beta < -1.10 \tag{5}$$

where $G2\beta$ denotes a magnification of the second lens group in the telephoto end state.

In the first aspect of the present invention, the following conditional expression (6) is preferably satisfied:

$$TLw/f34 < 2.90 \tag{6}$$

where TLw denotes a total lens length of the zoom lens system in the wide-angle end state, and f34 denotes a focal length of an air distance between the image side surface of the third lens and the object side surface of the fourth lens, which is defined by the following expression:

$$(1/f34) = ((1-n3)/r3R) + ((n4-1)/r4F) + d34 \times ((1-n3)/r3R) \times ((n4-1)/r4F)$$

where r3R denotes a radius of curvature of the image side surface of the third lens, r4F denotes a radius of curvature of the object side surface of the fourth lens, n3 denotes refractive index of the third lens at d-line ($\lambda = 587.6$ nm), n4 denotes refractive index of the fourth lens at d-line ($\lambda = 587.6$ nm), and d34 denotes a distance between the image side surface of the third lens and the object side surface of the fourth lens.

In the first aspect of the present invention, the following conditional expression (7) is preferably satisfied:

$$-1.10 < fw/f45 \quad (7)$$

where fw denotes a focal length of the zoom lens system in the wide-angle end state, and f45 denotes a focal length of an air distance between the image side surface of the fourth lens and the object side surface of the fifth lens, which is defined by the following expression:

$$(1/f45) = ((1-n4)/r4R) + ((n5-1)/r5F) + d45 \times ((1-n4)/r4R) \times ((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line ($\lambda$=587.6 nm), n5 denotes refractive index of the fifth lens at d-line ($\lambda$=587.6 nm), and d45 denotes a distance between the image side surface of the fourth lens and the object side surface of the fifth lens.

In the first aspect of the present invention, the following conditional expression (8) is preferably satisfied:

$$1.81 < L1n \quad (8)$$

where L1n denotes refractive index of the first lens at d-line ($\lambda$=587.6 nm).

In the first aspect of the present invention, it is preferable that the third lens has at least one aspherical surface.

According to a second aspect of the present invention, there is provided an optical apparatus using the zoom lens system according to the first aspect.

According to a third aspect of the present invention, there is provided a method for varying a focal length of a zoom lens system that consists of, in order from an object: a first lens group having negative refractive power and a second lens group having positive refractive power; the first lens group consisting of, in order from the object, a first lens having negative refractive power, and a second lens having positive refractive power, the second lens group consisting, in order from the object, a third lens having positive refractive power, a fourth lens having negative refractive power, and a fifth lens having positive refractive power, the method comprising a step of: varying a focal length of the zoom lens system from a wide-angle end state to a telephoto end state by decreasing a distance between the first lens group and the second lens group.

In the third aspect of the present invention, it is preferable that the first lens group has at least one aspherical surface.

In the third aspect of the present invention, it is preferable that the aspherical surface is disposed at least on the image side of the first lens.

In the third aspect of the present invention, it is preferable that the third lens, the fourth lens, and the fifth lens are disposed with respective air spaces in between.

In the third aspect of the present invention, it is preferable that the aspherical surface satisfies the following conditional expression (2):

$$0.10 < \Delta sag/fw < 0.50 \quad (2)$$

where $\Delta sag = XS(h) - X(h)$, in which sag amounts XS(h) and X(h) are denoted by the following spherical expression XS(h) and aspherical expression X(h) upon y=h=0.85r:

$$XS(y) = y^2/[r \times \{1 + (1 - y^2/r^2)^{1/2}\}]$$

$$X(y) = y^2/[r \times \{1 + (1 - Ky^2/r^2)^{1/2}\}] + C4 \times y^4 + C6 \times y^6 + C8 \times y^8 + C10 \times y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, XS(y) denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order, and where X(y) and XS(y) are positive toward the image.

In the third aspect of the present invention, the following conditional expression (3) is preferably satisfied:

$$1.05 < FNw \times fw/(-f1) < 1.85 \quad (3)$$

where FNw denotes an f-number of the zoom lens system in the wide-angle end state, fw denotes a focal length of the zoom lens system in the wide-angle end state, and f1 denotes a focal length of the first lens group.

In the third aspect of the present invention, the following conditional expression (4) is preferably satisfied:

$$1.85 < Z \times S1/S2 < 5.00 \quad (4)$$

where S1 denotes a thickness of the first lens group, S2 denotes a thickness of the second lens group, and Z denotes a zoom ratio of the zoom lens system.

In the third aspect of the present invention, the following conditional expression (5) is preferably satisfied:

$$-2.5 < G2\beta < -1.10 \quad (5)$$

where G2$\beta$ denotes a magnification of the second lens group in the telephoto end state.

In the third aspect of the present invention, the following conditional expression (6) is preferably satisfied:

$$TLw/f34 < 2.90 \quad (6)$$

where TLw denotes a total lens length of the zoom lens system in the wide-angle end state, and f34 denotes a focal length of an air distance between the image side surface of the third lens and the object side surface of the fourth lens, which is defined by the following expression:

$$(1/f34) = ((1-n3)/r3R) + ((n4-1)/r4F) + d34 \times ((1-n3)/r3R) \times ((n4-1)/r4F)$$

where r3R denotes a radius of curvature of the image side surface of the third lens, r4F denotes a radius of curvature of the object side surface of the fourth lens, n3 denotes refractive index of the third lens at d-line ($\lambda$=587.6 nm), n4 denotes refractive index of the fourth lens at d-line ($\lambda$=587.6 nm), and d34 denotes a distance between the image side surface of the third lens and the object side surface of the fourth lens.

In the third aspect of the present invention, the following conditional expression (7) is preferably satisfied:

$$-1.10 < fw/f45 \quad (7)$$

where fw denotes a focal length of the zoom lens system in the wide-angle end state, and f45 denotes a focal length of an air distance between the image side surface of the fourth lens and the object side surface of the fifth lens, which is defined by the following expression:

$$(1/f45) = ((1-n4)/r4R) + ((n5-1)/r5F) + d45 \times ((1-n4)/r4R) \times ((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line (λ=587.6 nm), n5 denotes refractive index of the fifth lens at d-line (λ=587.6 nm), and d45 denotes a distance between the image side surface of the fourth lens and the object side surface of the fifth lens.

In the third aspect of the present invention, the following conditional expression (8) is preferably satisfied:

$$1.81 < L1n \qquad (8)$$

where L1n denotes refractive index of the first lens at d-line (λ=587.6 nm).

In the third aspect of the present invention, it is preferable that the third lens has at least one aspherical surface.

The present invention makes it possible to provide a zoom lens system excellently correcting various aberrations with accomplishing to be compact, lightweight, and slim upon being accommodated, and to provide an optical apparatus using the zoom lens system.

BRIEF DESCRIPTION OF THE DRAWINGS

FIGS. 1A and 1B are diagrams showing an electronic still camera which is equipped with a zoom lens system according to the present embodiment explained later, in which FIG. 1A is a front view and FIG. 1B is a rear view.

FIGS. 4A, 4B and 4C are graphs showing various aberrations of the zoom lens system according to Example 1 upon focusing on infinity, in which FIG. 4A shows a wide-angle end state, FIG. 4B shows an intermediate focal length state, and FIG. 4C shows a telephoto end state.

FIGS. 6A, 6B and 6C are graphs showing various aberrations of the zoom lens system according to Example 2 upon focusing on infinity, in which FIG. 6A shows a wide-angle end state, FIG. 6B shows an intermediate focal length state, and FIG. 6C shows a telephoto end state.

FIGS. 8A, 8B and 8C are graphs showing various aberrations of the zoom lens system according to Example 3 upon focusing on infinity, in which FIG. 8A shows a wide-angle end state, FIG. 8B shows an intermediate focal length state, and FIG. 8C shows a telephoto end state.

FIGS. 10A, 10B and 10C are graphs showing various aberrations of the zoom lens system according to Example 4 upon focusing on infinity, in which FIG. 10A shows a wide-angle end state, FIG. 10B shows an intermediate focal length state, and FIG. 10C shows a telephoto end state.

FIGS. 12A, 12B and 12C are graphs showing various aberrations of the zoom lens system according to Example 5 upon focusing on infinity, in which FIG. 12A shows a wide-angle end state, FIG. 12B shows an intermediate focal length state, and FIG. 12C shows a telephoto end state.

FIGS. 14A, 14B and 14C are graphs showing various aberrations of the zoom lens system according to Example 6 upon focusing on infinity, in which FIG. 14A shows a wide-angle end state, FIG. 14B shows an intermediate focal length state, and FIG. 14C shows a telephoto end state.

DETAILED DESCRIPTION OF THE MOST PREFERRED EMBODIMENT

The present embodiment is going to be explained below.

Figure 1A:
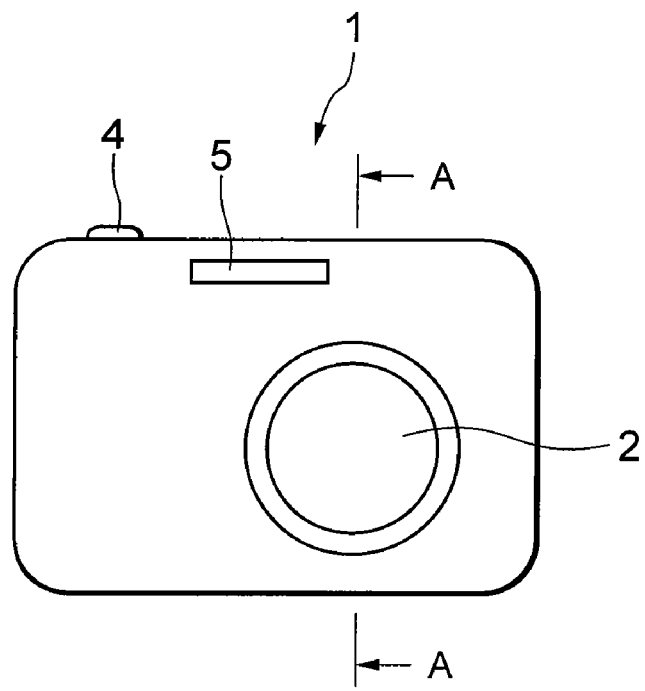
Figure 1B:
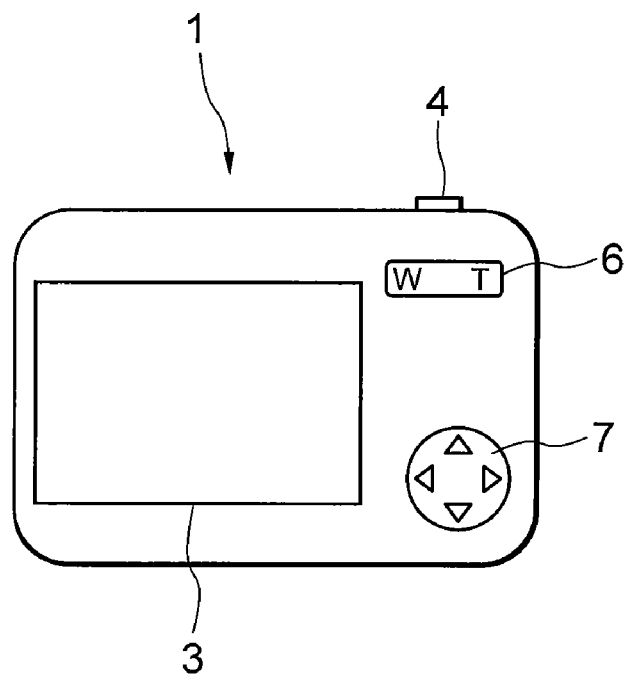
Figure 2:
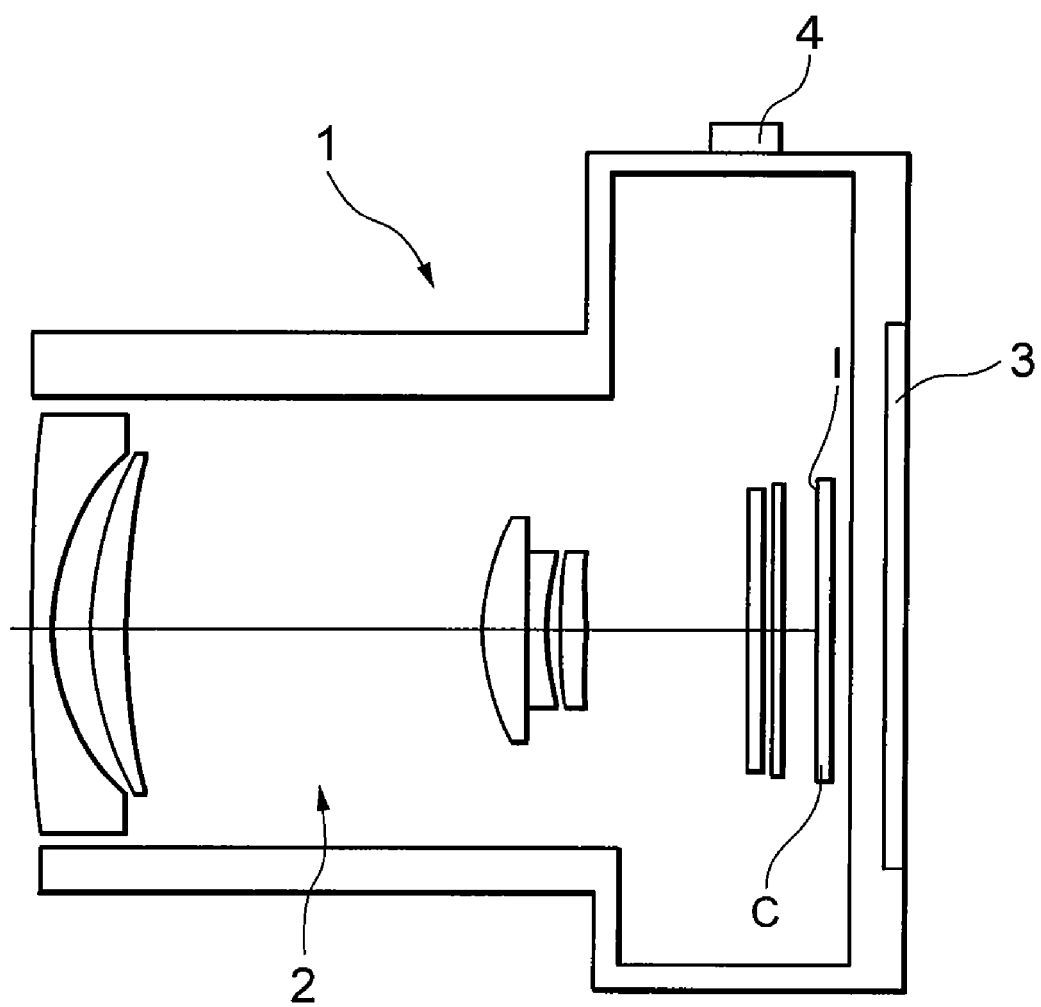
FIG. 2 is a cross-sectional view along the A-A line in FIG. 1A.

FIGS. 1A and 1B are diagrams showing an electronic still camera equipped with a zoom lens system according to a present embodiment, which is explained later, in which FIG. 1A is a front view and FIG. 1B is a rear view. FIG. 2 is a cross-sectional view along the A-A line in FIG. 1A.

In an electronic still camera 1 (hereinafter called a camera) according to the present embodiment shown in FIGS. 1A, 1B and 2, when a power switch button (not shown) is pressed, a shutter (not shown) is opened and light from a subject (not shown) is collected by an image-taking lens 2 and an image is formed on an imaging device C (such as CCD, CMOS, and the like) disposed on an image plane I. The subject image formed on the imaging device C is displayed on a liquid crystal monitor 3 disposed backside of the camera 1. After fixing the composition of the subject image with observing the liquid crystal monitor 3, a photographer depresses a release button 4 to take a picture of the subject image by the imaging device C, and stores in a memory (not shown).

The image-taking lens 2 is composed of a zoom lens system 2 according to the present embodiment explained later. Moreover, in the camera 1, there are disposed such as an auxiliary light emitter 5 that emits auxiliary light when the subject is dark, a W-T button 6 that makes the zoom lens system, which is the image-taking lens 2, zoom from a wide-angle end state (W) to a telephoto end state (T), and a function button 7 that is used for setting various conditions of the camera 1.

In this manner, the camera 1 equipped with the zoom lens system 2 according to the present embodiment explained later is composed.

Then, a zoom lens system according to the present embodiment is explained below.

A zoom lens system according to the present embodiment consists of, in order from an object, a first lens group having negative refractive power, and a second lens group having positive refractive power. When a state of the focal length varies from a wide-angle end state to a telephoto end state, the first lens group and the second lens group are moved along an optical axis such that a distance between the first lens group and the second lens group decreases. The first lens group consists of, in order from the object, a first lens with an aspherical surface having negative refractive power and a second lens having positive refractive power. The second lens group consists of, in order from the object, a third lens having positive refractive power, a fourth lens having negative refractive power, and a fifth lens having positive refractive power.

In such a two-lens-group zoom lens system composed of, in order from the object, a first lens group having negative refractive power, and a second lens group having positive refractive power, since the number of the lens groups is few, aberrations can be kept within preferable level with making configuration of each lens group relatively simple. With configuring the second lens group by three lenses which is, in order from the object, a third lens having positive refractive power, a fourth lens having negative refractive power, and a fifth lens having positive refractive power, it becomes possible to accomplish both compactness and preferable optical performance.

In such a negative-positive two-lens-group zoom lens system, the number of the lens groups can be few, and configuration of each lens group can be relatively simple. However, since the zoom lens system as a whole becomes a retro focus type, there is a disadvantage that distortion becomes large in the wide-angle end state. In order to correct distortion in the wide-angle end state, the first lens group is the most effective, in which the height of incident light largely varies between the wide-angle end state and the telephoto end state. However, since to make larger the dimension of the first lens group directly affects the dimension of the whole zoom lens system, the first lens group should be made slim and small as much as possible. In order not to make the first lens group thicker with keeping the number of the lenses two and with excellently correcting distortion, it is very effective to dispose an aspherical surface on the first lens having negative refractive power in the first lens group.

Moreover, in order to excellently correct distortion, the aspherical surface is preferably disposed at least on the image side of the first lens.

In a zoom lens system according to the present embodiment, the following conditional expression (1) is preferably satisfied:

$$0.76 < S2/fw < 1.30 \qquad (1)$$

where S2 denotes a thickness of the second lens group, and fw denotes a focal length of the zoom lens system in the wide-angle end state.

Conditional expression (1) defines a distance along the optical axis between the object side lens surface of the most object side lens in the second lens group and the most image side lens surface of the second lens group (the thickness of the second lens group) by the focal length of the zoom lens system in the wide-angle end state.

When the ratio S2/fw is equal to or falls below the lower limit of conditional expression (1), since the second lens group becomes too thin, burden on each lens in the second lens group becomes heavy, so that it becomes difficult to correct off-axis aberrations that should be corrected in this lens group, and astigmatism, in particular, becomes worse.

On the other hand, when the ratio S2/fw is equal to or exceeds the upper limit of conditional expression (1), the focal length of the zoom lens system in the wide-angle end state becomes too small, and a radius of curvature of each lens becomes small, so that spherical aberration and coma become worse. Otherwise the thickness of the second lens group becomes too thick, so that the lens barrel as a whole becomes large.

In order to secure the effect of the present embodiment, it is preferable to set the lower limit of conditional expression (1) to 0.80. In order to secure the effect of the present embodiment, it is preferable to set the upper limit of conditional expression (1) to 1.15.

In a zoom lens system according to the present embodiment, the third lens, the fourth lens, and the fifth lens are preferably disposed with respective air spaces in between. The second lens group consists of three lenses that are, in order from the object, the third lens having positive refractive power, the fourth lens having negative refractive power, and the fifth lens having positive refractive power, and each lens is disposed independently without cementing each other, thereby forming a triplet type in the second lens group, so that it becomes possible to accomplish compactness and good optical performance.

In a zoom lens system according to the present embodiment, in order to excellently correct distortion and coma, the following conditional expression (2) is preferably satisfied:

$$0.10 < \Delta sag/fw < 0.50 \qquad (2)$$

where $\Delta sag = XS(h) - X(h)$, in which sag amounts $XS(h)$ and $X(h)$ are denoted by the following spherical expression $XS(h)$ and aspherical expression $X(h)$ upon $y=h=0.85r$:

$$XS(y) = y^2/[r \times \{1 + (1 - y^2/r^2)^{1/2}\}]$$

$$X(y) = y^2/[r \times \{1 + (1 - K \times y^2/r^2)^{1/2}\}] + C4 \times y^4 + C6 \times y^6 + C8 \times y^8 + C10 \times y^{10}$$

where y denotes a vertical height from the optical axis, $X(y)$ denotes a sag amount which is a distance along the optical axis from the tangent surface at the vertex of the aspherical surface to the aspherical surface at the vertical height y from the optical axis, $XS(y)$ denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order. $X(y)$ and $XS(y)$ are positive toward the image.

Conditional expression (2) defines sag amount of spherical expression relative to that of aspherical expression at the effective aperture by the focal length of the zoom lens system in the wide-angle end state.

When the ratio $\Delta sag/fw$ is equal to or falls below the lower limit of conditional expression (2), an angle of the normal at the position of the effective aperture so called as a draft angle becomes large, so that it becomes difficult to fabricate. Otherwise the aspherical surface comes close to spherical shape, so that the effect of aspherical surface cannot be expected. Accordingly, it becomes difficult to correct distortion generating in the first lens group in the wide-angle end state.

On the other hand, when the ratio $\Delta sag/fw$ is equal to or exceeds the upper limit of conditional expression (2), the degree of aspherical shape becomes too steep, so that astigmatism and come become worse.

In order to secure the effect of the present embodiment, it is preferable to set the lower limit of conditional expression (2) to 0.15. In order to secure the effect of the present embodiment, it is preferable to set the upper limit of conditional expression (2) to 0.40.

In a zoom lens system according to the present embodiment, the following conditional expression (3) is preferably satisfied:

$$1.05 < FNw \times fw/(-f1) < 1.85 \quad (3)$$

where FNw denotes an f-number of the zoom lens system in the wide-angle end state, fw denotes a focal length of the zoom lens system in the wide-angle end state, and f1 denotes a focal length of the first lens group.

Conditional expression (3) defines a ratio of an f-number to the focal length of the first lens group.

When the value FNw×fw/(−f1) is equal to or falls below the lower limit of conditional expression (3), the focal length of the first lens group becomes too long, so that the total lens length of the zoom lens system becomes long. Otherwise the focal length of the second lens group becomes relatively small, and a radius of curvature of each lens composing the second lens group becomes small, so that it becomes difficult to correct spherical aberration and coma generating off-axis.

On the other hand, when the value FNw×fw/(−f1) is equal to or exceeds the upper limit of conditional expression (3), the focal length of the first lens group becomes too short, and the radius of curvature of the negative lens in the first lens group becomes small, so that it becomes difficult to correct lateral chromatic aberration. Otherwise the f-number of the zoom lens system in the wide-angle end state becomes large. Otherwise the focal length of the zoom lens system in the wide-angle end state becomes long, so that an angle of view becomes small.

In order to secure the effect of the present embodiment, it is preferable to set the lower limit of conditional expression (3) to 1.15. In order to secure the effect of the present embodiment, it is preferable to set the upper limit of conditional expression (3) to 1.40.

In a zoom lens system according to the present embodiment, the following conditional expression (4) is preferably satisfied:

$$1.85 < Z \times S1/S2 < 5.00 \quad (4)$$

where S1 denotes a distance along the optical axis between the object side surface of the first lens having negative refractive power disposed to the most object side of the first lens group and the image side surface of the second lens having positive refractive power disposed to the most image side of the first lens group, which is the thickness of the first lens group, S2 denotes a distance along the optical axis between the object side surface of the third lens having positive refractive power located to the most object side of the second lens group and the image side surface of the fifth lens having positive refractive power disposed to the most image side of the second lens group, which is the thickness of the second lens group, and Z denotes the ratio of the focal length of the zoom lens system in the telephoto end state to that in the wide-angle end state (zoom ratio).

Conditional expression (4) defines the thicknesses of the first lens group and the second lens group by the zoom ratio.

When the value Z×S1/S2 is equal to or falls below the lower limit of conditional expression (4), the thickness of the first lens group becomes too thin, so that it becomes difficult to correct distortion. Otherwise the focal length in the wide-angle end state becomes too long, so that it becomes difficult to secure a sufficient angle of view. Otherwise the focal length in the telephoto end state becomes too short, so that it becomes difficult impossible to secure a sufficient zoom ratio.

On the other hand, when the value Z×S1/S2 is equal to or exceeds the upper limit of conditional expression (4), the thickness of the second lens group becomes too short, so that it becomes impossible to correct spherical aberration and coma.

In order to secure the effect of the present embodiment, it is preferable to set the lower limit of conditional expression (4) to 2.30. In order to secure the effect of the present embodiment, it is preferable to set the upper limit of conditional expression (4) to 4.00.

In a zoom lens system according to the present embodiment, the following conditional expression (5) is preferably satisfied:

$$-2.50 < G2\beta < -1.10 \quad (5)$$

where $G2\beta$ denotes a magnification of the second lens group in the telephoto end state.

Conditional expression (5) defines an appropriate range of the magnification of the second lens group in the telephoto end state.

When the value $G2\beta$ is equal to or falls below the lower limit of conditional expression (5), the focal length of the first lens group becomes small, since the first lens group consists of two lenses that are the first lens having negative refractive power and the second lens having positive refractive power, the radius of curvature of each lens becomes too small, so that it becomes difficult to balance astigmatism over entire focal length range from the wide-angle end state to the telephoto end state.

On the other hand, when the value $G2\beta$ is equal to or exceeds the upper limit of conditional expression (5), the focal length of the zoom lens system in the telephoto end state becomes small, so that in order to secure the zoom ratio, the focal length of the zoom lens system in the wide-angle end state becomes too small, and the first lens group becomes large. Otherwise it becomes difficult to excellently correct distortion generating in the wide-angle end state.

In a zoom lens system according to the present embodiment the following conditional expression (6) is preferably satisfied:

$$TLw/f34 < 2.90 \quad (6)$$

where TLw denotes a total lens length of the zoom lens system in the wide-angle end state, and f34 denotes a focal length of an air distance between the image side surface of the third lens and the object side surface of the fourth lens, which is defined by the following expression:

$$(1/f34) = ((1-n3)/r3R) + ((n4-1)/r4F) + d34 \times ((1-n3)/r3R) \times ((n4-1)/r4F)$$

where r3R denotes a radius of curvature of the image side surface of the third lens, r4F denotes a radius of curvature of the object side surface of the fourth lens, n3 denotes refractive index of the third lens at d-line (λ=587.6 nm), n4 denotes refractive index of the fourth lens at d-line (λ=587.6 nm), and d34 denotes a distance between the image side surface of the third lens and the object side surface of the fourth lens.

Conditional expression (6) defines a focal length of an air lens upon considering the air space between the third lens and the fourth lens in the second lens group as an air lens.

When the ratio TLw/f34 is equal to or exceeds the upper limit of conditional expression (6), the radius of curvature of the image side surface of the third lens becomes too small, the edge width cannot be secured. Otherwise it becomes difficult to correct spherical aberration and coma by this surface. Otherwise upon making refractive index of the third lens higher, it also becomes difficult to correct chromatic aberration.

In order to secure the effect of the present embodiment, it is preferable to set the upper limit of conditional expression (6) to 2.00.

In a zoom lens system according to the present embodiment, the following conditional expression (7) is preferably satisfied:

$$-1.10 < fw/f45 \quad (7)$$

where fw denotes a focal length of the zoom lens system in the wide-angle end state, and f45 denotes a focal length of an air distance between the image side surface of the fourth lens and the object side surface of the fifth lens, which is defined by the following expression:

$$(1/f45)=((1-n4)/r4R)+((n5-1)/r5F)+d45\times((1-n4)/r4R)\times((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line ($\lambda$=587.6 nm), n5 denotes refractive index of the fifth lens at d-line ($\lambda$=587.6 nm), and d45 denotes a distance between the image side surface of the fourth lens and the object side surface of the fifth lens.

Conditional expression (7) defines a focal length of an air lens upon considering the air space between the fourth lens and the fifth lens in the second lens group as an air lens.

When the ratio fw/f45 is equal to or falls below the lower limit of conditional expression (7), radius of curvature of the image side surface of the fourth lens becomes small, so that the second lens group becomes thicker. Otherwise deviation of the light coming out from the surface becomes too large, off-axis aberrations, coma in particular, are exceedingly generated.

In order to secure the effect of the present embodiment, it is preferable to set the lower limit of conditional expression (7) to −0.50.

In a zoom lens system according to the present embodiment, the following conditional expression (8) is preferably satisfied:

$$1.81 < L1n \quad (8)$$

where L1n denotes refractive index of the first lens in the first lens group at d-line ($\lambda$=587.6 nm).

Conditional expression (8) defines an appropriate range of refractive index of the first lens in the first lens group. In order to make the system compact with using thinner lens, and with composing the first lens group with less number of lenses, it is necessary to satisfy conditional expression (8).

When the value L1n is equal to or falls blow the lower limit of conditional expression (8), it becomes impossible to correct Petzval sum, so that various aberrations become difficult to be corrected.

In order to secure the effect of the present embodiment, it is preferable to set the lower limit of conditional expression (8) to 1.82.

In a zoom lens system according to the present embodiment, the third lens, which is the most object side lens of the second lens group, preferably has an aspherical surface. With disposing an aspherical surface in the third lens, it becomes possible to excellently correct spherical aberration and coma.

In a negative-positive two-lens-group zoom lens system according to the present embodiment, since the diameter of the second lens group can generally be smaller than that of the first lens group, vibration reduction is preferably carried out by shifting a portion of the second lens group. In a zoom lens system according to the present embodiment, since the second lens group is made compact and lightweight, it becomes possible to shift the image by the second lens group as a whole, so that the drive mechanism for vibration reduction can be simple.

Moreover, as a method of vibration reduction, an image blur can be corrected by shifting a portion of lens group in a direction perpendicular to the optical axis. However, shifting the whole lens group in a body permits a plurality of lenses, which generate fewer amount of coma upon vibration reduction, to be shifted in a body, so that a better vibration reduction effect can be obtained with suppressing deterioration in optical performance upon decentering in comparison with the case a portion of lens group is shifted.

A zoom lens system according to each Example of the present embodiment is explained below.

EXAMPLE 1

Figure 3:
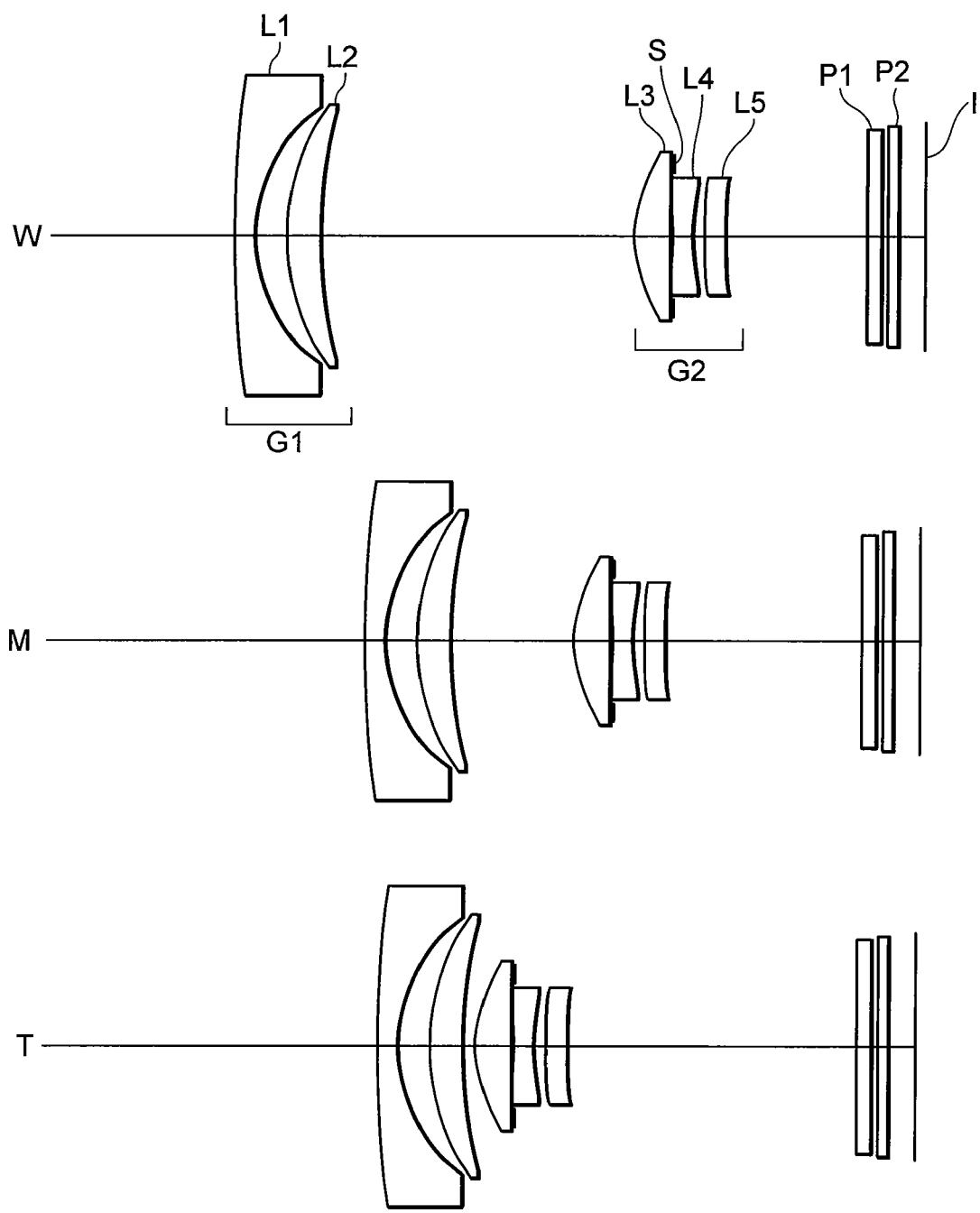
FIG. 3 is a diagram showing a lens configuration of a zoom lens system according to Example 1 of the present embodiment, in which W denotes a wide-angle end state, M denotes an intermediate focal length state, and T denotes a telephoto end state.

FIG. 3 is a diagram showing a lens configuration of a zoom lens system according to Example 1 of the present embodiment, in which W denotes a wide-angle end state, M denotes an intermediate focal length state, and T denotes a telephoto end state. Reference symbols used in the following explanations are attached only to a diagram showing the wide-angle end state W, and are omitted in the other states. The same rule is applied to the other Examples.

The first lens group G1 having negative refractive power as a whole is composed of two lenses that are, in order from the object, a negative meniscus lens L1 having a convex surface facing the object, and a positive meniscus lens L2 having a convex surface facing the object.

The second lens group G2 having positive refractive power as a whole is composed of three lenses that are, in order from the object, a positive meniscus lens L3 having a convex surface facing the object, a double concave negative lens L4, and a double convex positive lens L5. Those three lenses are independently disposed with respective air spaces in between.

An aperture stop S for defining an f-number is disposed to the image side adjacent to the third lens L3, and moved together with the second lens group G2.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 1 are listed in Table 1.

In [Specifications], f denotes a focal length, Bf denotes a back focal length, FNO denotes an f-number, and 2ω denotes an angle of view (unit: degree).

In [Lens Data], the first column shows the lens surface number counted in order from the object side, the second column "r" shows a radius of curvature of the lens surface, the third column "d" shows a distance to the next lens surface along the optical axis, the fourth column "vd" shows Abbe number of the medium at d-line (wavelength $\lambda$=587.6 nm), and the fifth column "nd" shows refractive index of the medium at d-line (wavelength $\lambda$=587.6 nm). In the second column "r", "r=0.0000" denotes a plane surface. Refractive index of the air nd=1.000000 is omitted.

In [Aspherical Data], an aspherical surface is exhibited by the following expression:

$$X(y)=y^2/[r\cdot\{1+(1-\kappa\cdot y^2/r^2)^{1/2}\}]+C4\cdot y^4+C6\cdot y^6+C8\cdot y^8+C10\cdot y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), K denotes a conical coefficient, and Cn denotes aspherical coefficient of n-th order. In [Aspherical Data], "E-n" (n: integer) denotes "×10⁻ⁿ". The position of an aspherical surface is expressed by attaching "*" to the right side of the surface number and a radius of curvature of a reference sphere is shown in the second column "r".

In [Variable Distances], a focal length f, the distance between the object and the most object side lens surface D0, values for respective variable distances with respect to wide-angle end state W, intermediate focal length state M, and telephoto end state T are shown. In [Values for Conditional Expressions], values for respective conditional expressions are shown.

In the tables for various values, unless otherwise specified, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Specifications]

|   | W | M | T |
|---|---|---|---|
| f = | 5.5 | 9.5 | 16.0 |
| FNO = | 2.92 | 3.67 | 4.78 |
| 2ω = | 71.89° | 43.58° | 26.38° |
| Bf = | 1.4329 (constant) | | |

[Lens Data]

| | r | d | νd | nd |
|---|---|---|---|---|
| 1 | 38.5603 | 1.0000 | 40.43 | 1.836100 |
| 2* | 4.7895 | 1.5652 | | |
| 3 | 7.6599 | 1.6000 | 23.78 | 1.846660 |
| 4 | 17.6635 | D4 | | |
| 5 | 4.3651 | 1.8000 | 52.32 | 1.755000 |
| 6 | 90.0000 | 0.1175 | | |
| 7* | −30.7854 | 1.0000 | 24.06 | 1.821140 |
| 8 | 8.0018 | 0.5302 | | |
| 9 | 20.7522 | 1.1000 | 58.19 | 1.622630 |
| 10* | −21.2884 | D10 | | |
| 11 | 0.0000 | 0.6000 | 64.20 | 1.516800 |
| 12 | 0.0000 | 0.4000 | | |
| 13 | 0.0000 | 0.5000 | 64.20 | 1.516800 |
| 14 | 0.0000 | Bf | | |

[Aspherical Data]

Surface Number: 2

K = 0.2995
C4 = 2.79880E−04
C6 = 4.52510E−07
C8 = 1.20380E−07
C10 = −2.64930E−09

Surface Number: 7

K = 70.0000
C4 = 3.31030E−04
C6 = 6.81250E−05
C8 = 9.41930E−07
C10 = −2.76200E−08

TABLE 1-continued

Surface Number: 10

K = −92.7552
C4 = 2.06340E−03
C6 = 4.21370E−04
C8 = −1.51580E−05
C10 = 6.90940E−06

[Variable Distances]

|   | W | M | T |
|---|---|---|---|
| f | 5.50000 | 9.50000 | 16.00000 |
| D0 | ∞ | ∞ | ∞ |
| D4 | 15.33691 | 5.97220 | 0.74113 |
| D10 | 6.92749 | 9.66744 | 14.11985 |

[Values for Conditional Expressions]

(1): S2/fw = 0.827
(2): Δsag/fw = 0.208
(3): FNw × fw/(−f1) = 1.201
(4): Z × S1/S2 = 2.664
(5): G2β = −1.197
(6): TLw/f34 = −1.190
(7): fw/f45 = −0.390
(8): L1n = 1.8361

Figure 4A:
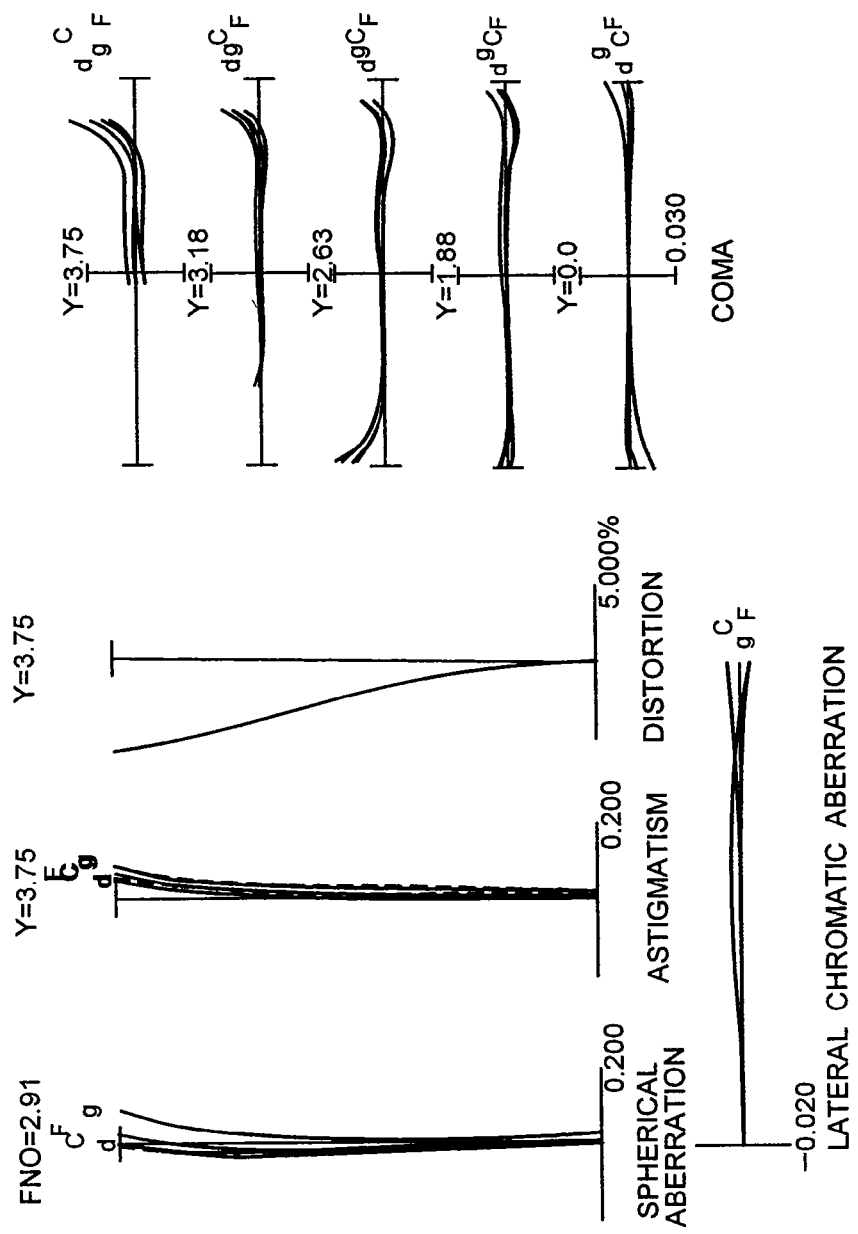
Figure 4B:
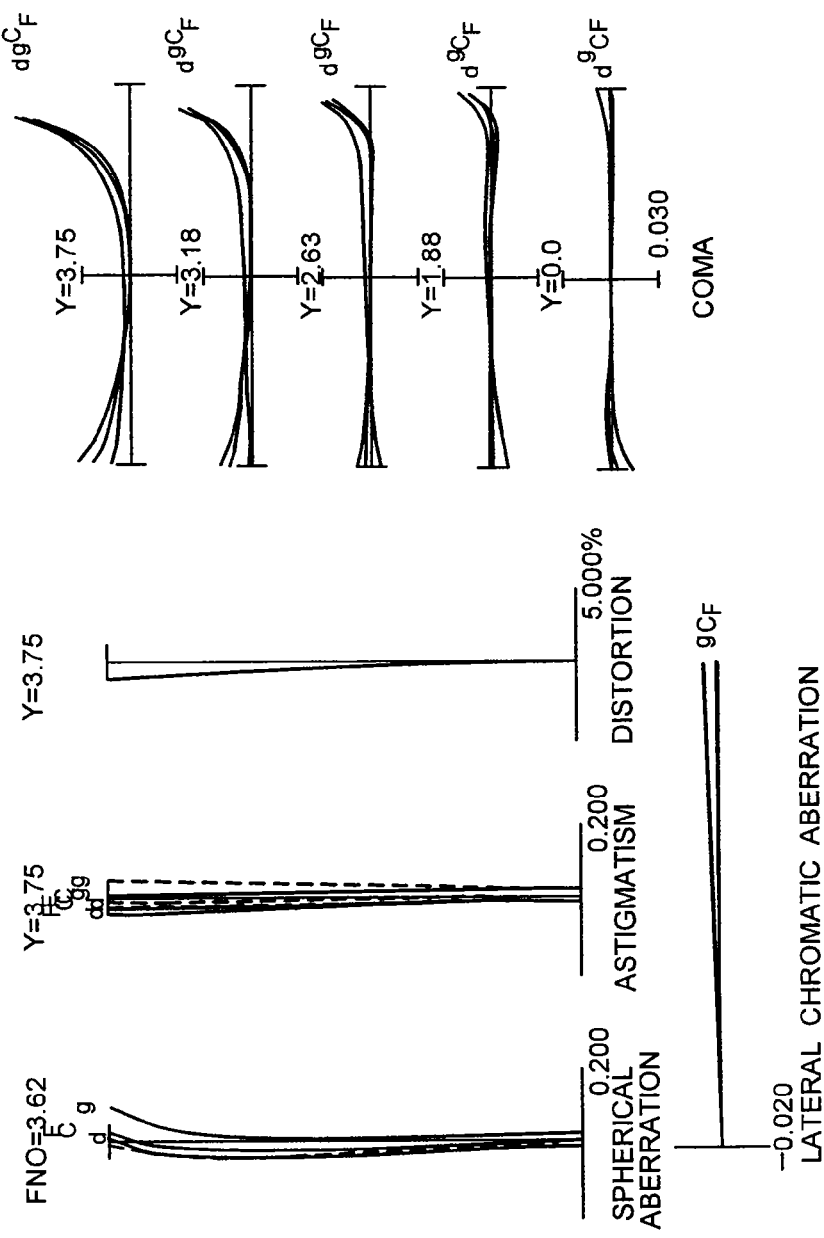
Figure 4C:
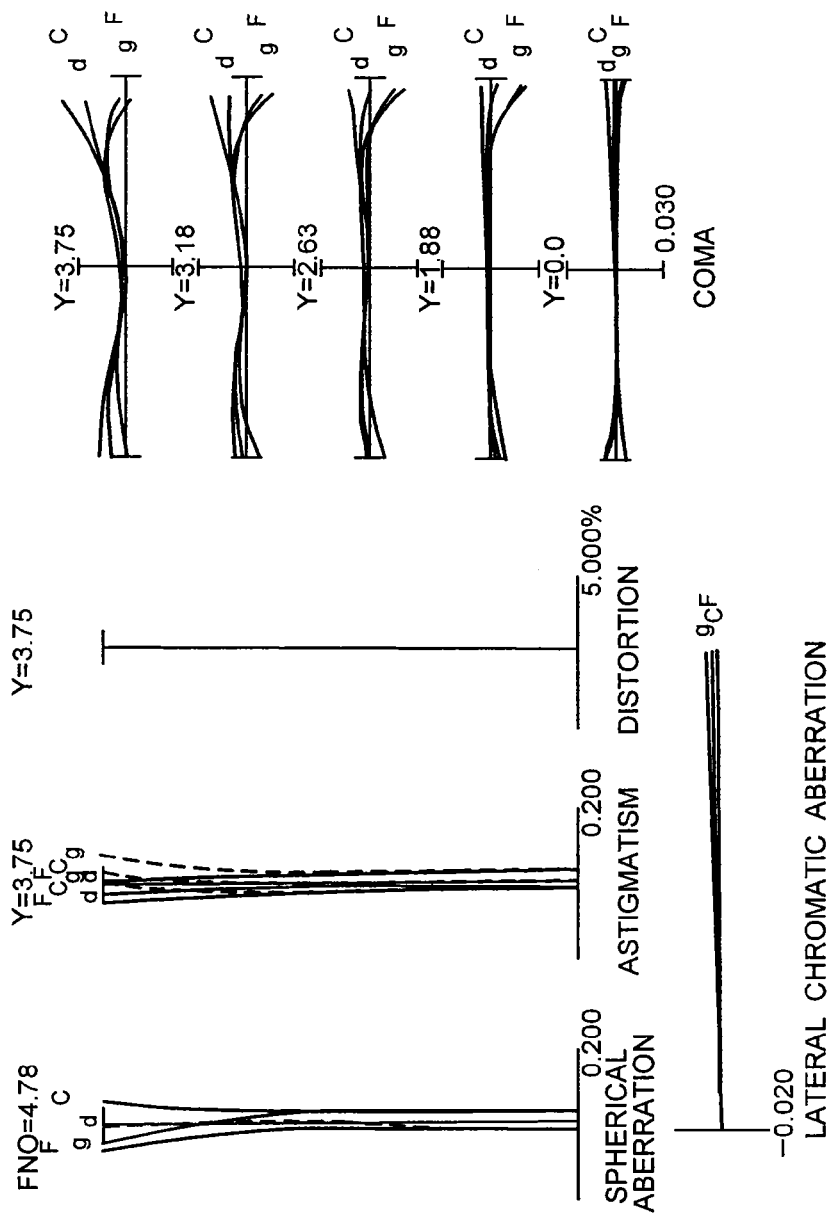

FIGS. 4A, 4B and 4C are graphs showing various aberrations of the zoom lens system according to Example 1 upon focusing on infinity, in which FIG. 4A shows a wide-angle end state, FIG. 4B shows an intermediate focal length state, and FIG. 4C shows a telephoto end state.

In respective graphs, FNO denotes an f-number, Y denotes an image height, d denotes an aberration curve at d-line (wavelength λ=587.6 nm), g denotes an aberration curve at g-line (wavelength λ=435.6 nm), C denotes an aberration curve at C-line (wavelength λ=656.3 nm), and F denotes an aberration curve at F-line (wavelength λ=486.1 nm). In graphs showing spherical aberration, the f-number with respect to the maximum diameter is shown. In graphs showing astigmatism and distortion, the maximum value of the image height Y is shown. In graphs showing coma, each image height Y is shown. In the graph showing astigmatism, a solid line indicates a sagittal image plane, and a broken line indicates a meridional image plane. In graphs showing coma upon shifting, θ denotes a deviation angle of the second lens group with respect to the optical axis. The above-described explanation regarding various aberration graphs is the same as the other examples.

As is apparent from the respective graphs, the zoom lens system according to Example 1 shows superb optical performance as a result of good corrections to various aberrations over entire zoom range from the wide-angle end state W to the telephoto end state T even in the state upon shifting.

EXAMPLE 2

Figure 5:
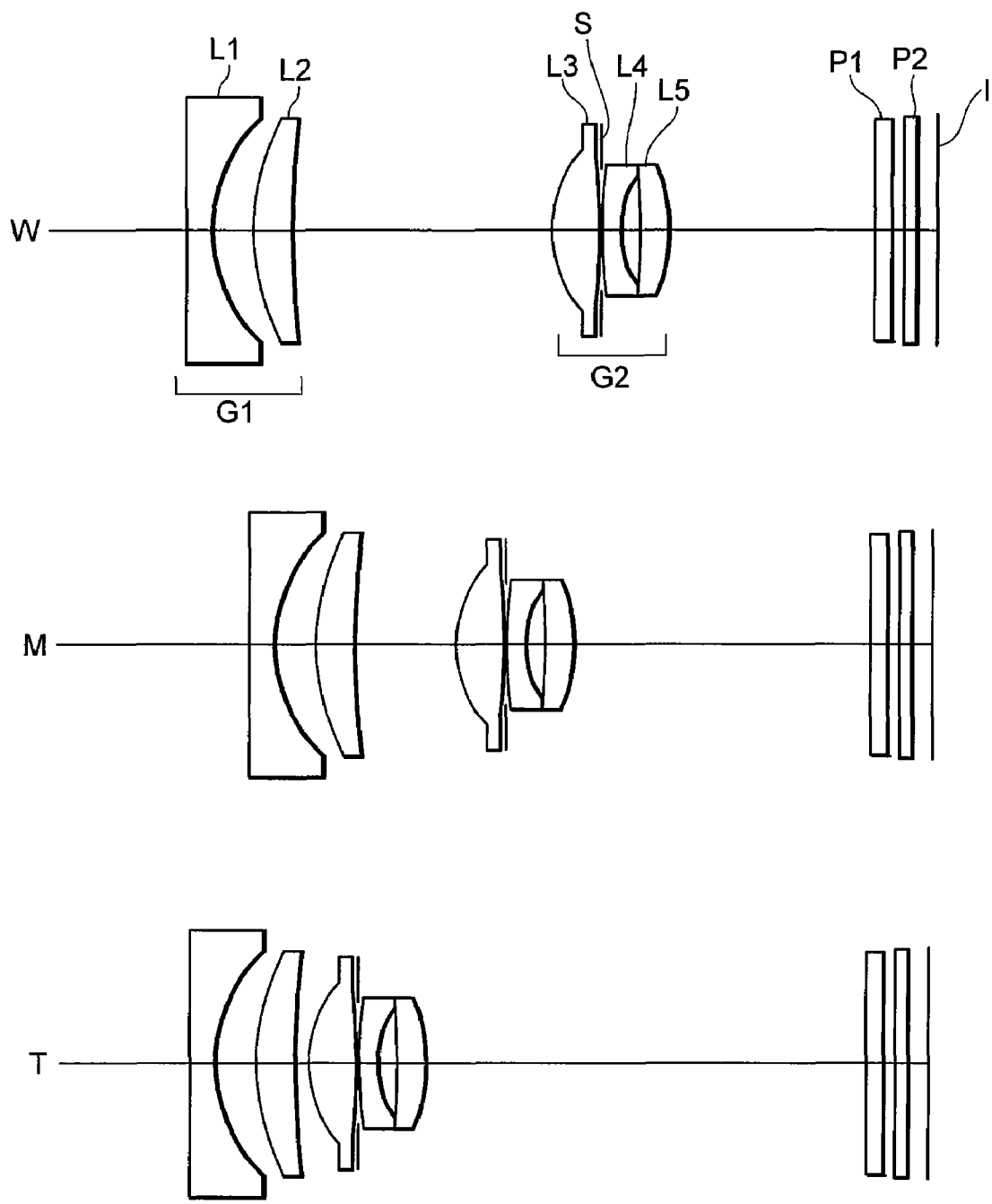
FIG. 5 is a diagram showing a lens configuration of a zoom lens system according to Example 2 of the present embodiment, in which W denotes a wide-angle end state, M denotes an intermediate focal length state, and T denotes a telephoto end state.

FIG. 5 is a diagram showing a lens configuration of a zoom lens system according to Example 2 of the present embodiment, in which W denotes a wide-angle end state, M denotes an intermediate focal length state, and T denotes a telephoto end state.

In FIG. 5, the zoom lens system according to Example 2 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a double concave negative lens L1, and a positive meniscus lens L2 having a convex surface facing the object.

The second lens group G2 having positive refractive power as a whole is composed of three lenses that are, in order from the object, a double convex positive lens L3, a negative meniscus lens L4 having a convex surface facing the object, and a positive meniscus lens L5 having a concave surface facing the object. Those three lenses are independently disposed with respective air spaces in between.

An aperture stop S for defining an f-number is disposed to the image side adjacent to the third lens L3, and moved together with the second lens group G2.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 2 are listed in Table 2.

TABLE 2

[Specifications]

|   | W | M | T |
|---|---|---|---|
| f = | 6.4 | 11.0 | 18.2 |
| FNO = | 3.1 | 4. | 5.42 |
| 2ω = | 64.3° | 38.3° | 23.4° |
| Bf = | 0.91466 (constant) | | |

[Lens Data]

|   | r | d | vd | nd |
|---|---|---|---|---|
| 1 | −469.4821 | 1.0000 | 40.94 | 1.806100 |
| 2* | 4.8392 | 1.8000 | | |
| 3 | 8.9995 | 1.6000 | 22.76 | 1.808090 |
| 4 | 27.5683 | D4 | | |
| 5* | 4.0126 | 2.0000 | 53.22 | 1.693500 |
| 6* | −12.4122 | 0.1000 | | |
| 7 | 20.7298 | 0.8000 | 28.27 | 2.003300 |
| 8 | 3.6444 | 0.8000 | | |
| 9 | −21.3325 | 1.2000 | 59.10 | 1.583320 |
| 10* | −6.1453 | D10 | | |
| 11 | 0.0000 | 0.7600 | 64.20 | 1.516800 |
| 12 | 0.0000 | 0.5000 | | |
| 13 | 0.0000 | 0.5000 | 64.20 | 1.516800 |
| 14 | 0.0000 | Bf | | |

[Aspherical Data]

Surface Number: 2

K = 1.0434
C4 = −8.12290E−04
C6 = −3.18460E−05
C8 = 5.48330E−07
C10 = −9.95350E−08

Surface Number: 5

K = 0.3781
C4 = 5.44620E−05
C6 = 2.75390E−05
C8 = 0.00000E+00
C10 = 0.00000E+00

TABLE 2-continued

Surface Number: 6

K = 1.0000
C4 = 2.94430E−03
C6 = −1.14100E−04
C8 = 3.23020E−06
C10 = 0.00000E+00

Surface Number: 10

K = 3.5947
C4 = −1.40950E−04
C6 = 9.75960E−05
C8 = 1.00000E−14
C10 = 1.00000E−16

[Variable Distances]

|   | W | M | T |
|---|---|---|---|
| f | 6.40000 | 11.00000 | 18.20000 |
| D0 | ∞ | ∞ | ∞ |
| D4 | 10.79155 | 4.10717 | 0.42805 |
| D10 | 8.52883 | 12.41792 | 18.50519 |

[Values for Conditional Expressions]

(1): S2/fw = 0.766
(2): Δsag/fw = 0.193
(3): FNw × fw/(−f1) = 1.802
(4): Z × S1/S2 = 2.554
(5): G2β = −1.655
(6): TLw/f34 = 3.255
(7): fw/f45 = −1.975
(8): L1n = 1.8061

Figure 6A:
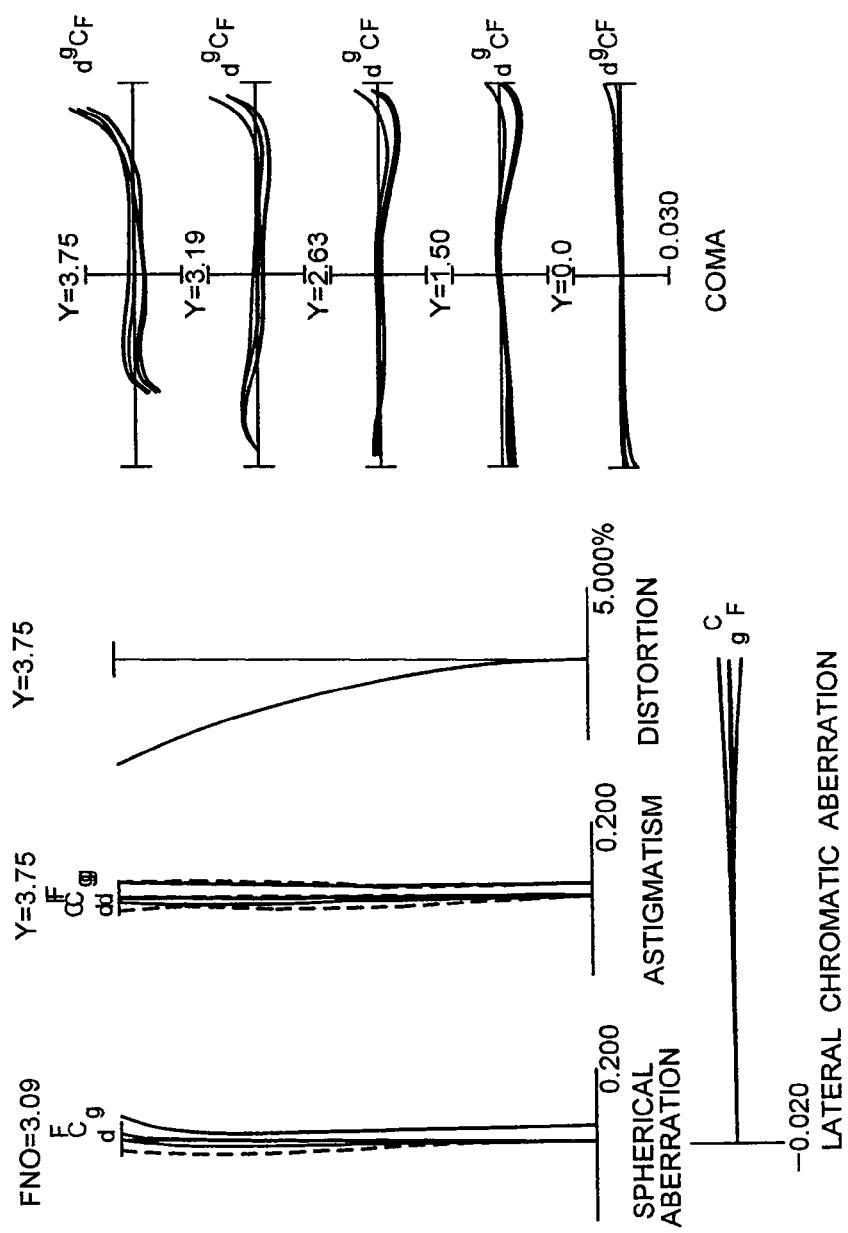
Figure 6B:
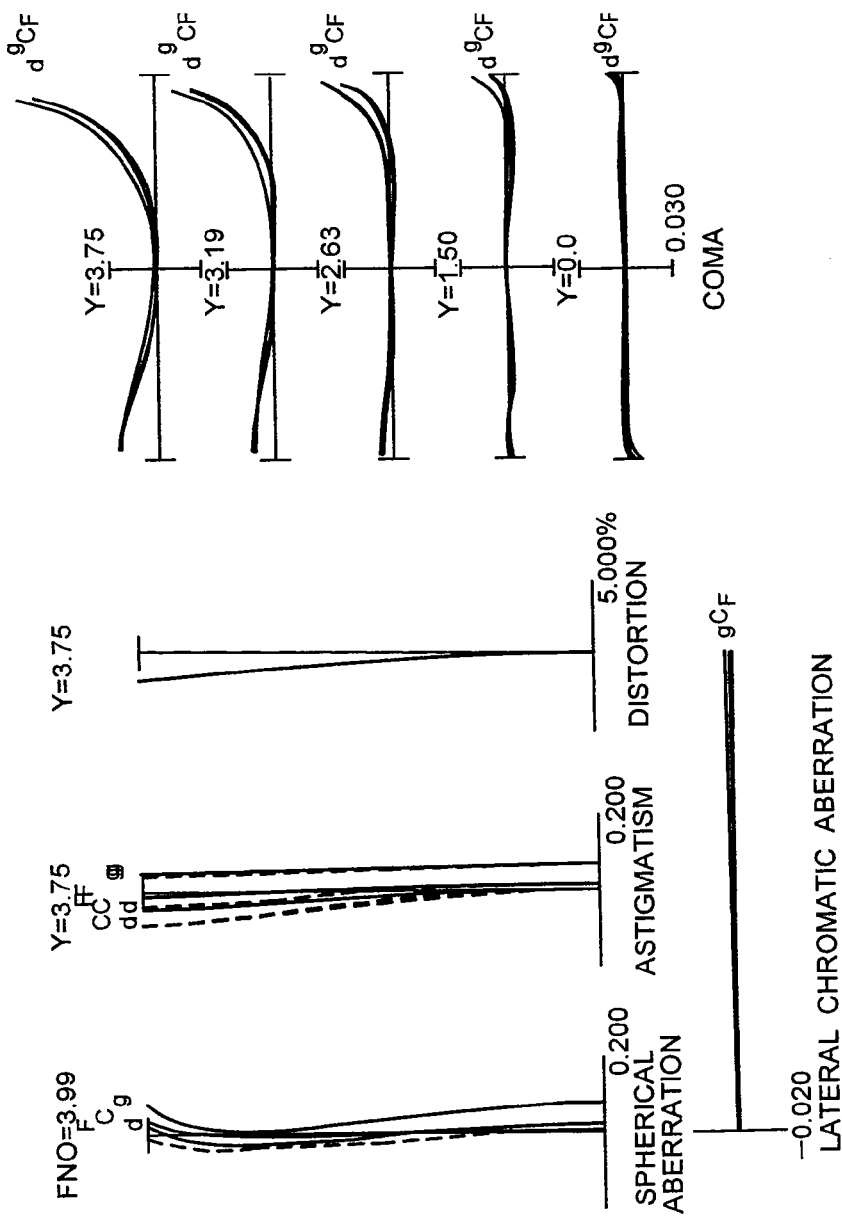
Figure 6C:
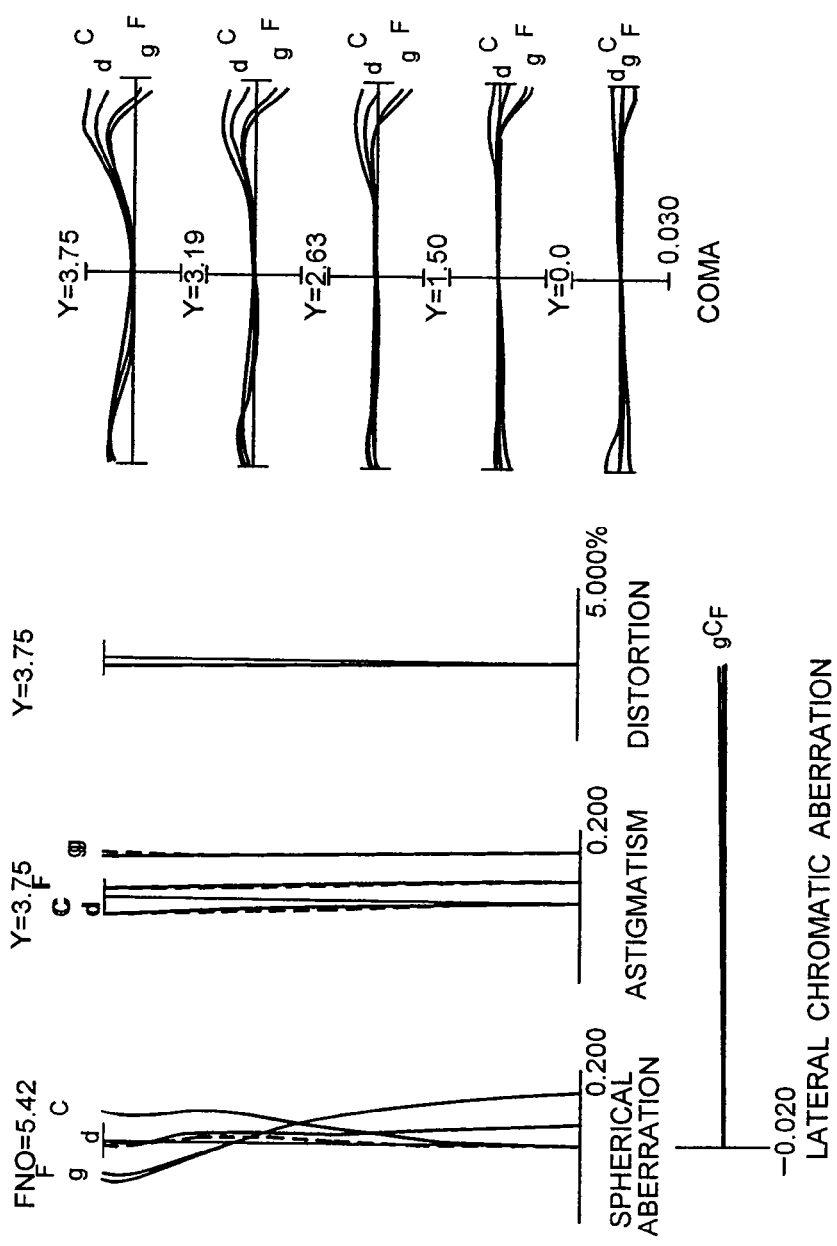

FIGS. 6A, 6B and 6C are graphs showing various aberrations of the zoom lens system according to Example 2 upon focusing on infinity, in which FIG. 6A shows a wide-angle end state, FIG. 6B shows an intermediate focal length state, and FIG. 6C shows a telephoto end state.

As is apparent from the respective graphs, the zoom lens system according to Example 2 shows superb optical performance as a result of good corrections to various aberrations over entire zoom range from the wide-angle end state W to the telephoto end state T even in the state upon shifting.

EXAMPLE 3

Figure 7:
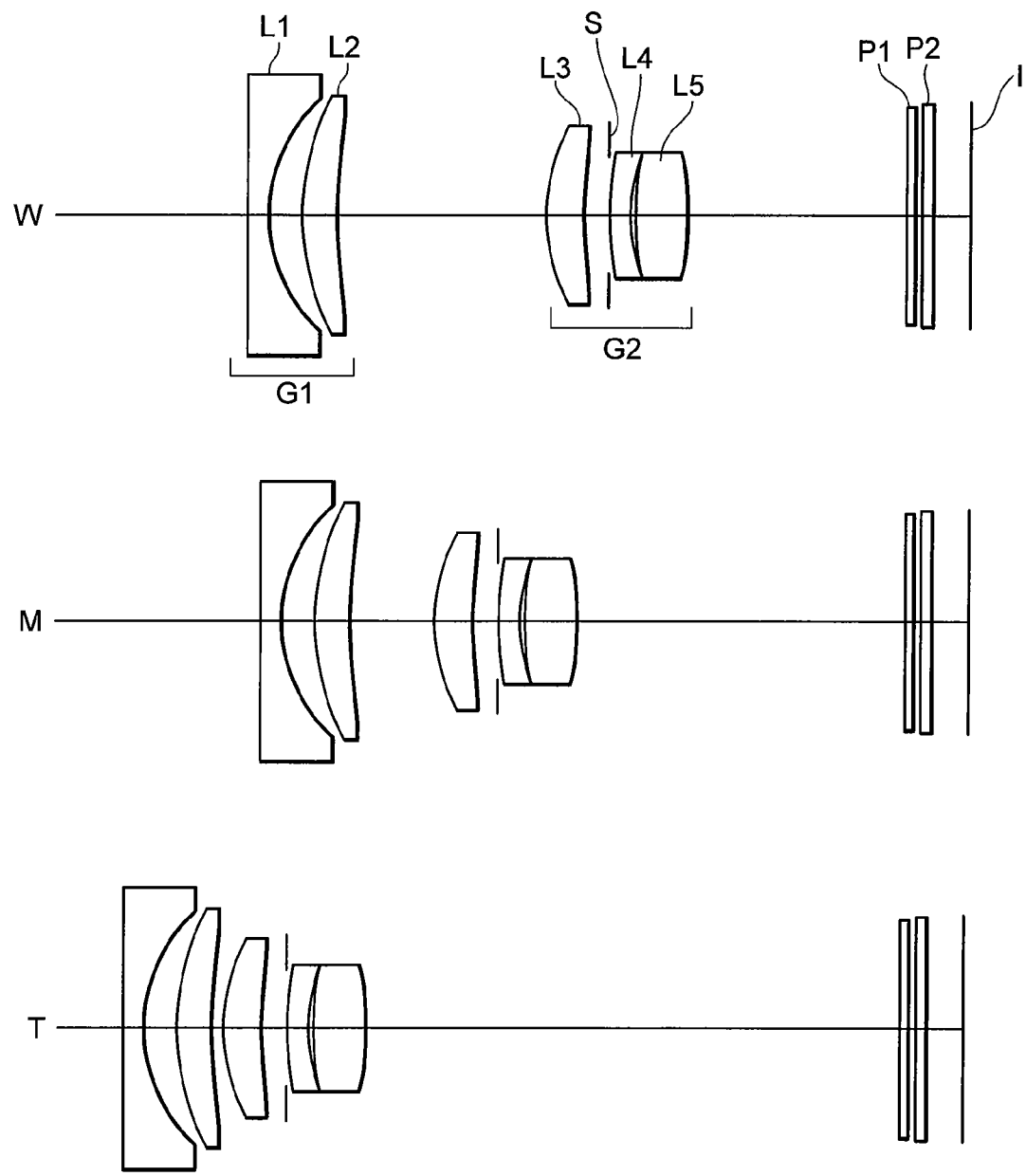
FIG. 7 is a diagram showing a lens configuration of a zoom lens system according to Example 3 of the present embodiment, in which W denotes a wide-angle end state, M denotes an intermediate focal length state, and T denotes a telephoto end state.

FIG. 7 is a diagram showing a lens configuration of a zoom lens system according to Example 3 of the present embodiment, in which W denotes a wide-angle end state, M denotes an intermediate focal length state, and T denotes a telephoto end state.

In FIG. 7, the zoom lens system according to Example 3 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a double concave negative lens L1, and a positive meniscus lens L2 having a convex surface facing the object.

The second lens group G2 having positive refractive power as a whole is composed of three lenses that are, in order from the object, a positive meniscus lens L3 having a convex surface facing the object, a negative meniscus lens L4 having a convex surface facing the object, and a double convex positive lens L5. Those three lenses are independently disposed with respective air spaces in between.

An aperture stop S for defining an f-number is disposed to the object side adjacent to the fourth lens L4, and moved together with the second lens group G2.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 3 are listed in Table 3.

TABLE 3

[Specifications]

|   | W | M | T |
|---|---|---|---|
| f = | 6.5 | 11.0 | 21.0 |
| FNO = | 3.37 | 4.44 | 6.84 |
| 2ω = | 63.6° | 38.5° | 20.37° |
| Bf = | 1.77954 (constant) | | |

[Lens Data]

|   | r | d | vd | nd |
|---|---|---|---|---|
| 1 | −112.3306 | 0.8000 | 40.94 | 1.806100 |
| 2* | 4.2371 | 1.7000 | | |
| 3 | 8.5683 | 1.6000 | 22.76 | 1.808090 |
| 4 | 28.7483 | D4 | | |
| 5* | 5.3890 | 1.8000 | 57.79 | 1.609700 |
| 6 | 19.7297 | 1.2458 | | |
| 7 | 13.9576 | 1.0000 | 23.78 | 1.846660 |
| 8 | 5.4653 | 0.2400 | | 1 |
| 9 | 10.3653 | 2.4000 | 63.38 | 1.618000 |
| 10 | −10.7596 | D10 | | 1 |
| 11 | 0.0000 | 0.4000 | 64.14 | 1.516330 |
| 12 | 0.0000 | 0.4000 | | 1 |
| 13 | 0.0000 | 0.5000 | 64.14 | 1.516330 |
| 14 | 0.0000 | Bf | | |

[Aspherical Data]

Surface Number: 2

K = 0.1801
C4 = 1.75500E−05
C6 = −3.23480E−06
C8 = −3.83910E−07
C10 = 2.26310E−08

Surface Number: 5

K = 0.2254
C4 = −3.03930E−06
C6 = 1.40380E−06
C8 = −7.32240E−08
C10 = 1.00000E−16

[Variable Distances]

|   | W | M | T |
|---|---|---|---|
| f | 6.5000 | 11.0000 | 21.0000 |
| D0 | ∞ | ∞ | ∞ |
| D4 | 9.84520 | 4.18087 | 0.28477 |
| D10 | 10.35216 | 15.35216 | 26.46327 |

[Values for Conditional Expressions]

(1): S2/fw = 1.029
(2): Δsag/fw = 0.174
(3): FNw × fw/(−f1) = 2.480
(4): Z × S1/S2 = 1.981
(5): G2β = −2.360

TABLE 3-continued (6): TLw/f34 = 1.093
(7): fw/f45 = −0.605
(8): L1n = 1.80610

Figure 8A:
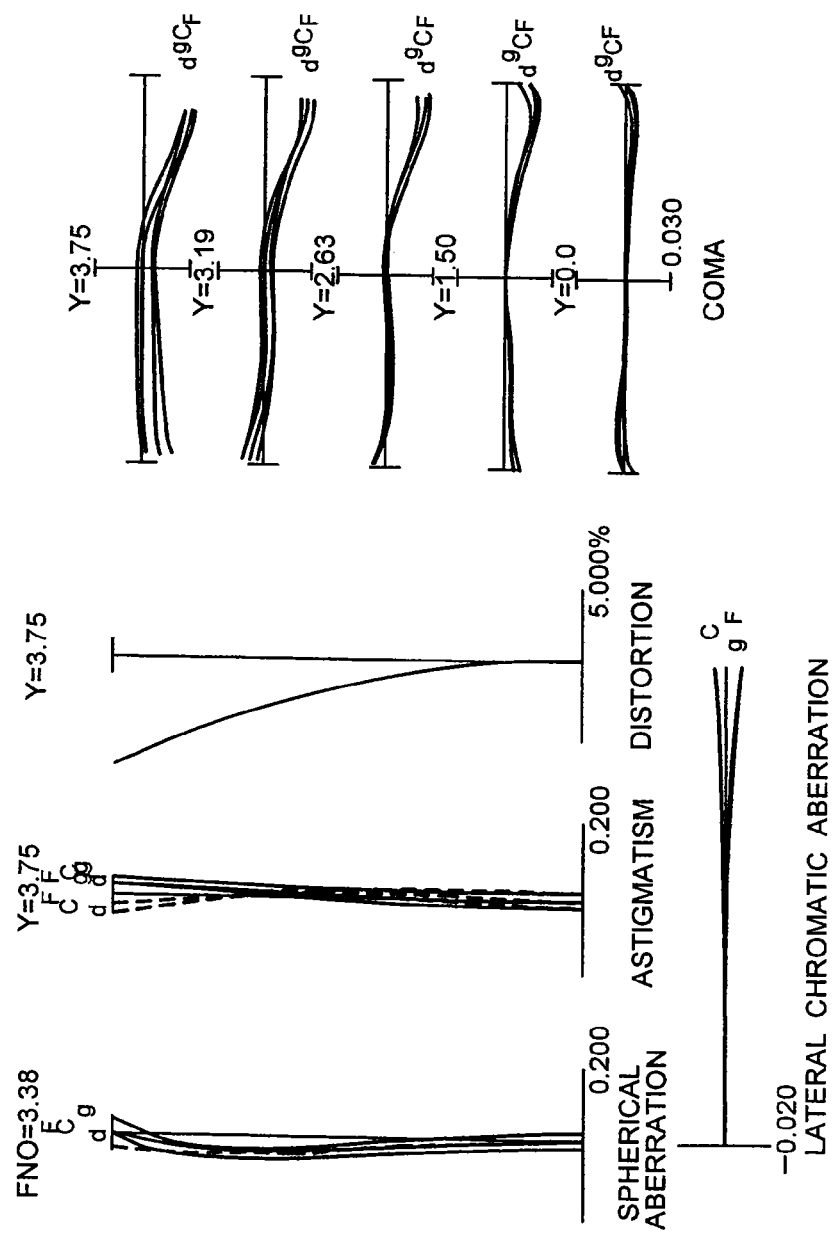
Figure 8B:
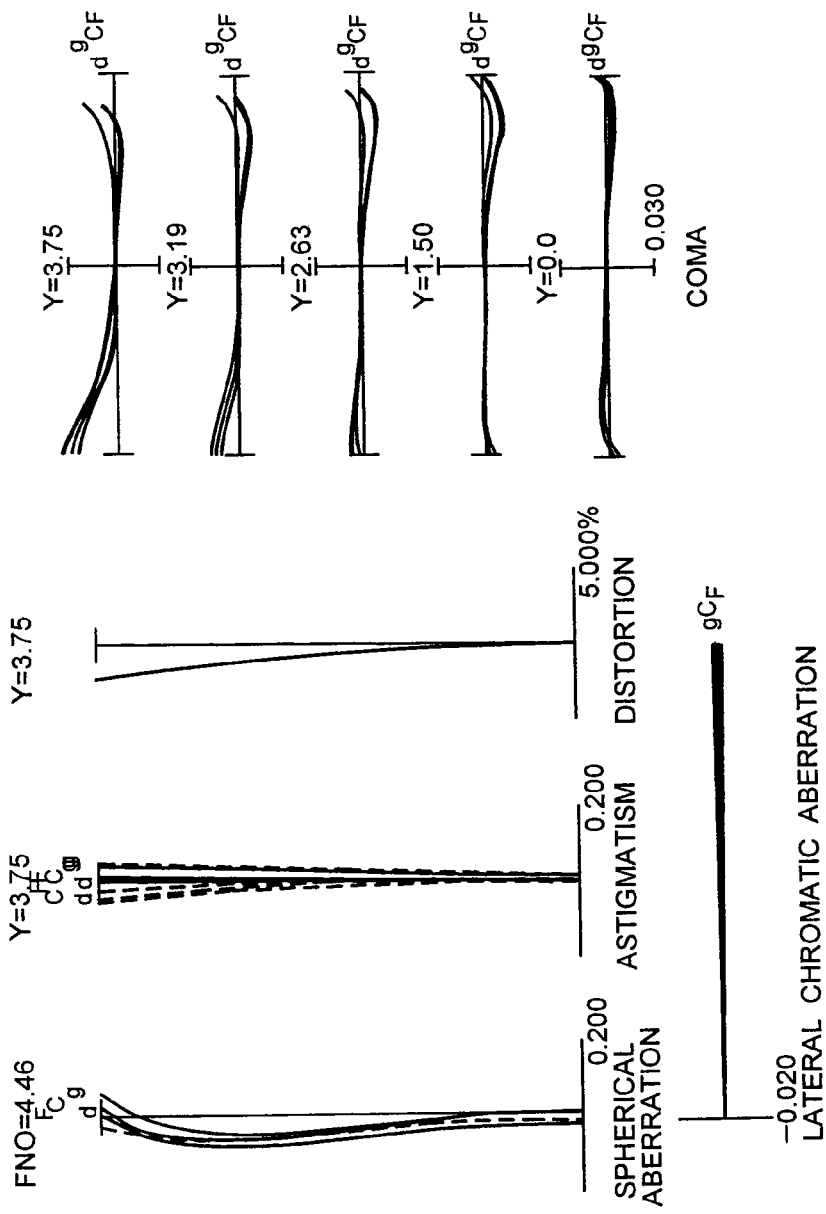
Figure 8C:
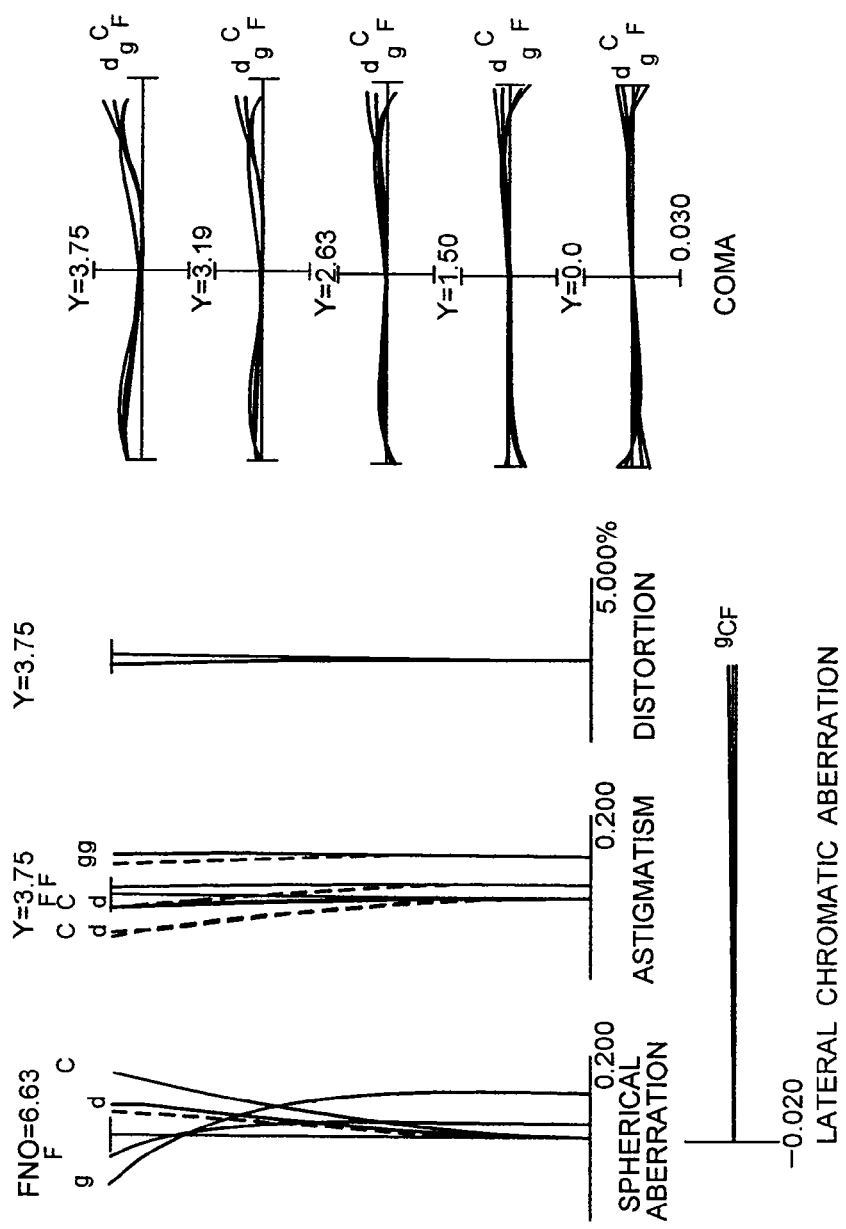

FIGS. 8A, 8B and 8C are graphs showing various aberrations of the zoom lens system according to Example 3 upon focusing on infinity, in which FIG. 8A shows a wide-angle end state, FIG. 8B shows an intermediate focal length state, and FIG. 8C shows a telephoto end state.

As is apparent from the respective graphs, the zoom lens system according to Example 3 shows superb optical performance as a result of good corrections to various aberrations over entire zoom range from the wide-angle end state W to the telephoto end state T even in the state upon shifting.

EXAMPLE 4

Figure 9:
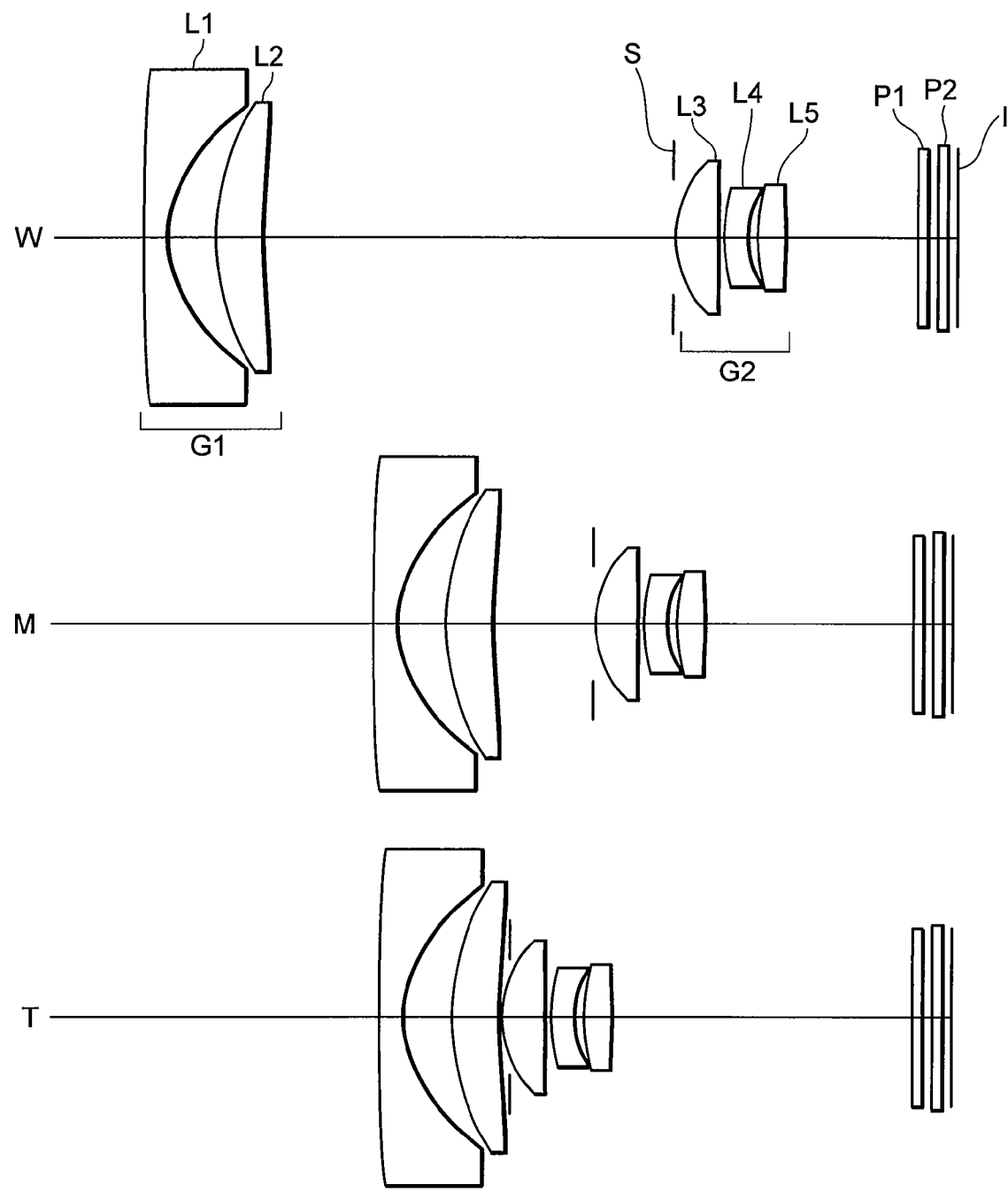
FIG. 9 is a diagram showing a lens configuration of a zoom lens system according to Example 4 of the present embodiment, in which W denotes a wide-angle end state, M denotes an intermediate focal length state, and T denotes a telephoto end state.

FIG. 9 is a diagram showing a lens configuration of a zoom lens system according to Example 4 of the present embodiment, in which W denotes a wide-angle end state, M denotes an intermediate focal length state, and T denotes a telephoto end state.

In FIG. 8, the zoom lens system according to Example 4 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a negative meniscus lens L1 having a convex surface facing the object, and a positive meniscus lens L2 having a convex surface facing the object.

The second lens group G2 having positive refractive power as a whole is composed of three lenses that are, in order from the object, a double convex positive lens L3, a negative meniscus lens L4 having a convex surface facing the object, and a double convex positive lens L5. Those three lenses are independently disposed with respective air spaces in between.

An aperture stop S for defining an f-number is disposed to the object side adjacent to the third lens L3, and moved together with the second lens group G2.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 4 are listed in Table 4.

TABLE 4

[Specifications]

|   | W | M | T |
|---|---|---|---|
| f = | 3.5 | 7.7 | 12.7 |
| FNO = | 3.11 | 4.17 | 5.45 |
| 2ω = | 85.9° | 43.0° | 26.7° |
| Bf = | 0.05297 (constant) | | |

TABLE 4-continued

[Lens Data]

| | r | d | νd | nd |
|---|---|---|---|---|
| 1 | 101.1102 | 0.9120 | 40.10 | 1.851350 |
| 2* | 4.2784 | 2.1120 | | |
| 3 | 9.4772 | 2.0000 | 22.76 | 1.808095 |
| 4 | 49.5757 | D4 | | |
| 5* | 3.4894 | 1.8000 | 61.18 | 1.589130 |
| 6* | −32.6621 | 0.3000 | | |
| 7 | 8.7985 | 0.8400 | 23.78 | 1.846660 |
| 8 | 2.9115 | 0.5000 | | |
| 9 | 7.9621 | 1.1000 | 45.79 | 1.548141 |
| 10 | −22.8424 | D10 | | |
| 11 | 0.0000 | 0.4000 | 70.51 | 1.544370 |
| 12 | 0.0000 | 0.3650 | | |
| 13 | 0.0000 | 0.4000 | 64.14 | 1.516330 |
| 14 | 0.0000 | Bf | | |

[Aspherical Data]

Surface Number: 2

K = 0.0900
C4 = 2.65640E−04
C6 = −2.38170E−06
C8 = −1.06040E−07
C10 = 1.83270E−09

Surface Number: 5

K = −1.2552
C4 = 4.33080E−03
C6 = −1.13180E−04
C8 = 3.99280E−06
C10 = 4.22200E−08

Surface Number: 6

K = 7.0620
C4 = −3.31720E−05
C6 = 8.47890E−05
C8 = 1.77340E−06
C10 = −1.89990E−06

[Variable Distances]

| | W | M | T |
|---|---|---|---|
| f | 3.50000 | 7.70000 | 12.70000 |
| D0 | ∞ | ∞ | ∞ |
| D4 | 17.60255 | 4.39471 | 0.06142 |
| D10 | 5.91156 | 9.10356 | 12.90356 |

[Values for Conditional Expressions]

(1): S2/fw = 1.297
(2): Δsag/fw = 0.321
(3): FNw × fw/(−f1) = 1.030
(4): Z × S1/S2 = 4.015
(5): G2β = −1.203
(6): TLw/f34 = 4.036
(7): fw/f45 = −0.742
(8): L1n = 1.85135

Figure 10A:
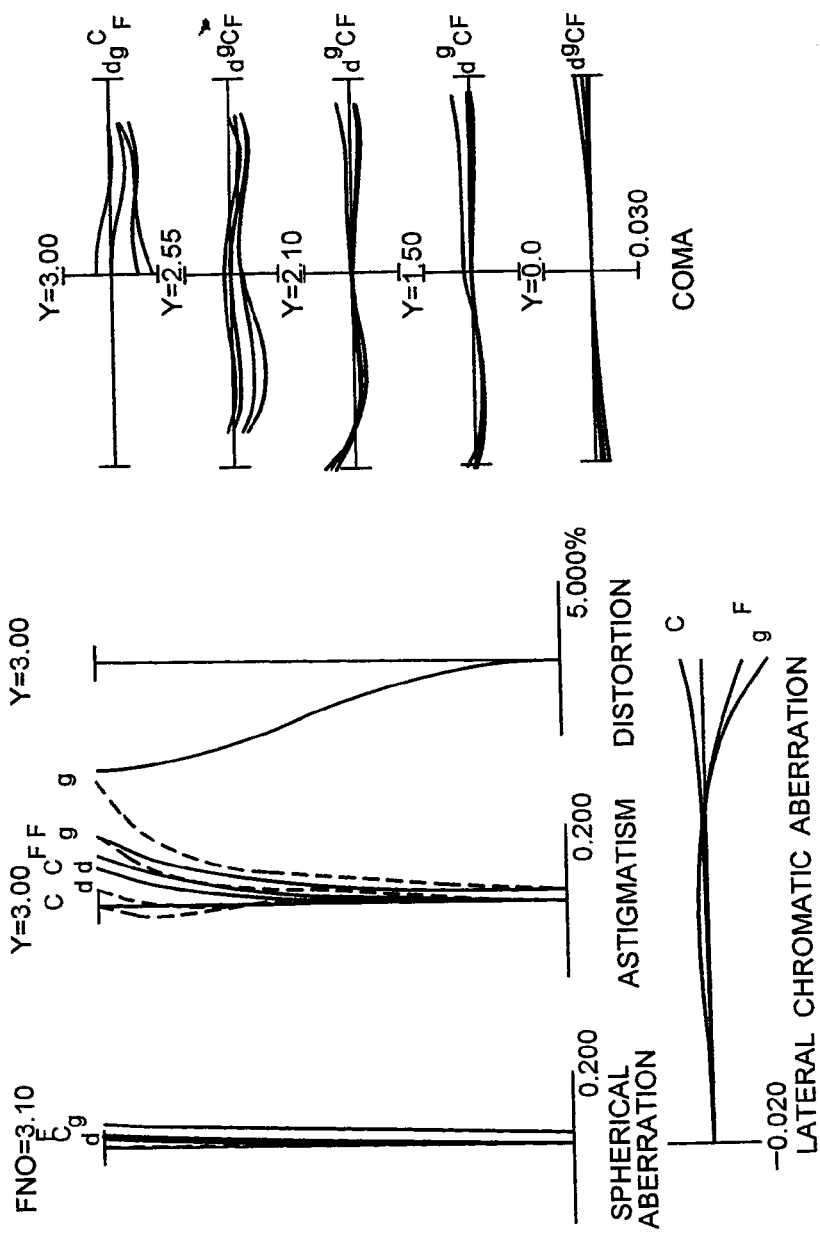
Figure 10B:
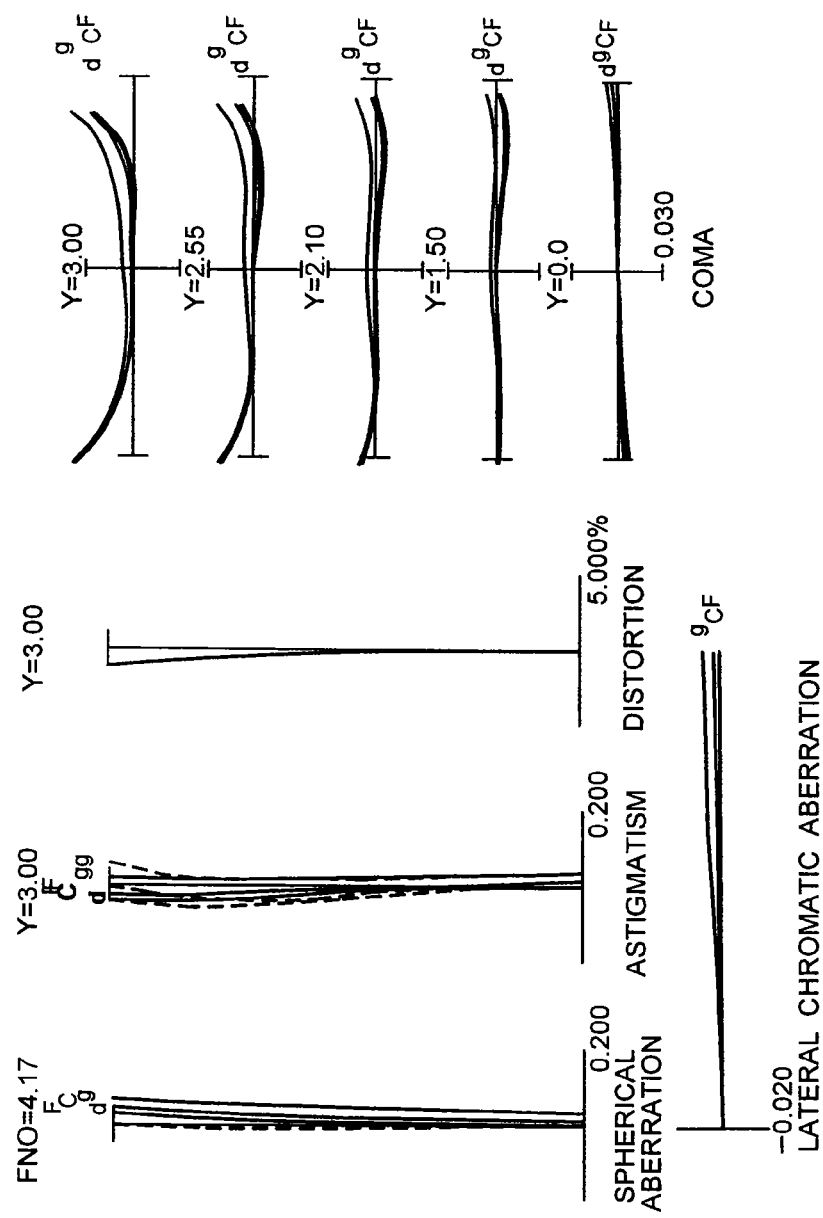
Figure 10C:
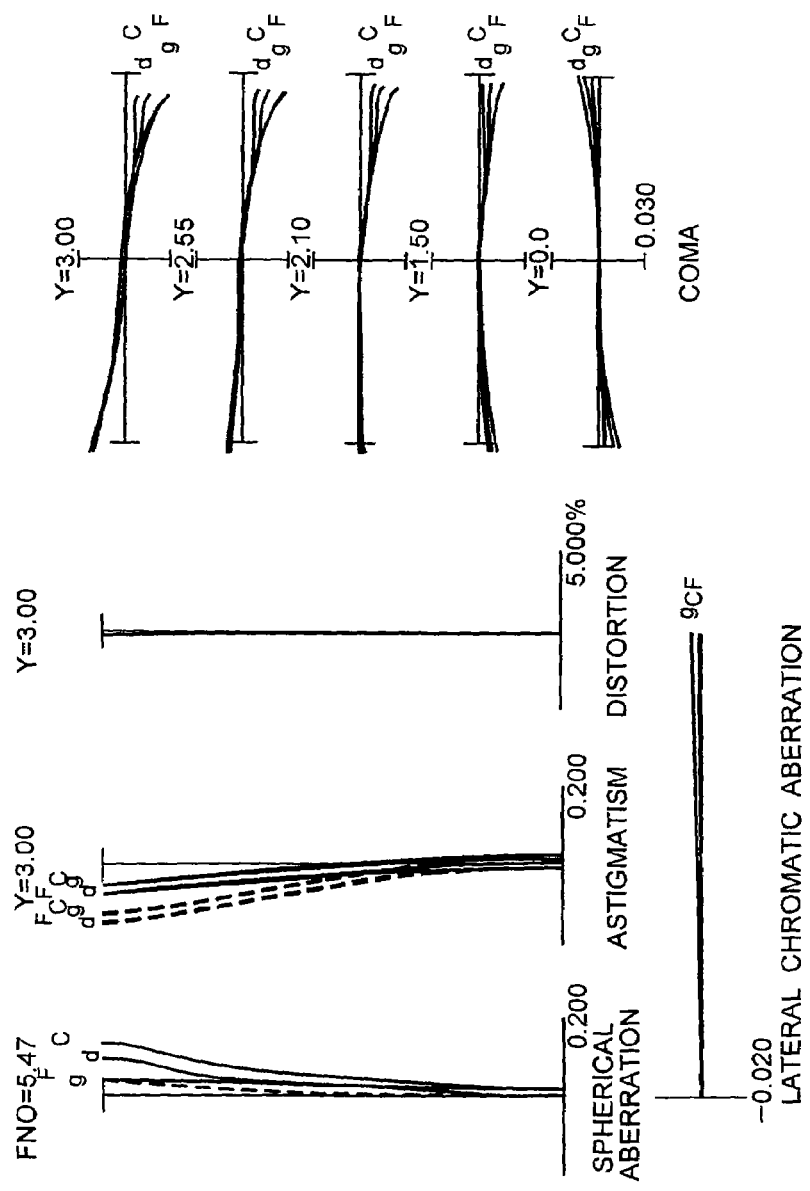

FIGS. 10A, 10B and 10C are graphs showing various aberrations of the zoom lens system according to Example 4 upon focusing on infinity, in which FIG. 10A shows a wide-angle end state, FIG. 10B shows an intermediate focal length state, and FIG. 10C shows a telephoto end state.

As is apparent from the respective graphs, the zoom lens system according to Example 4 shows superb optical performance as a result of good corrections to various aberrations over entire zoom range from the wide-angle end state W to the telephoto end state T even in the state upon shifting.

EXAMPLE 5

Figure 11:
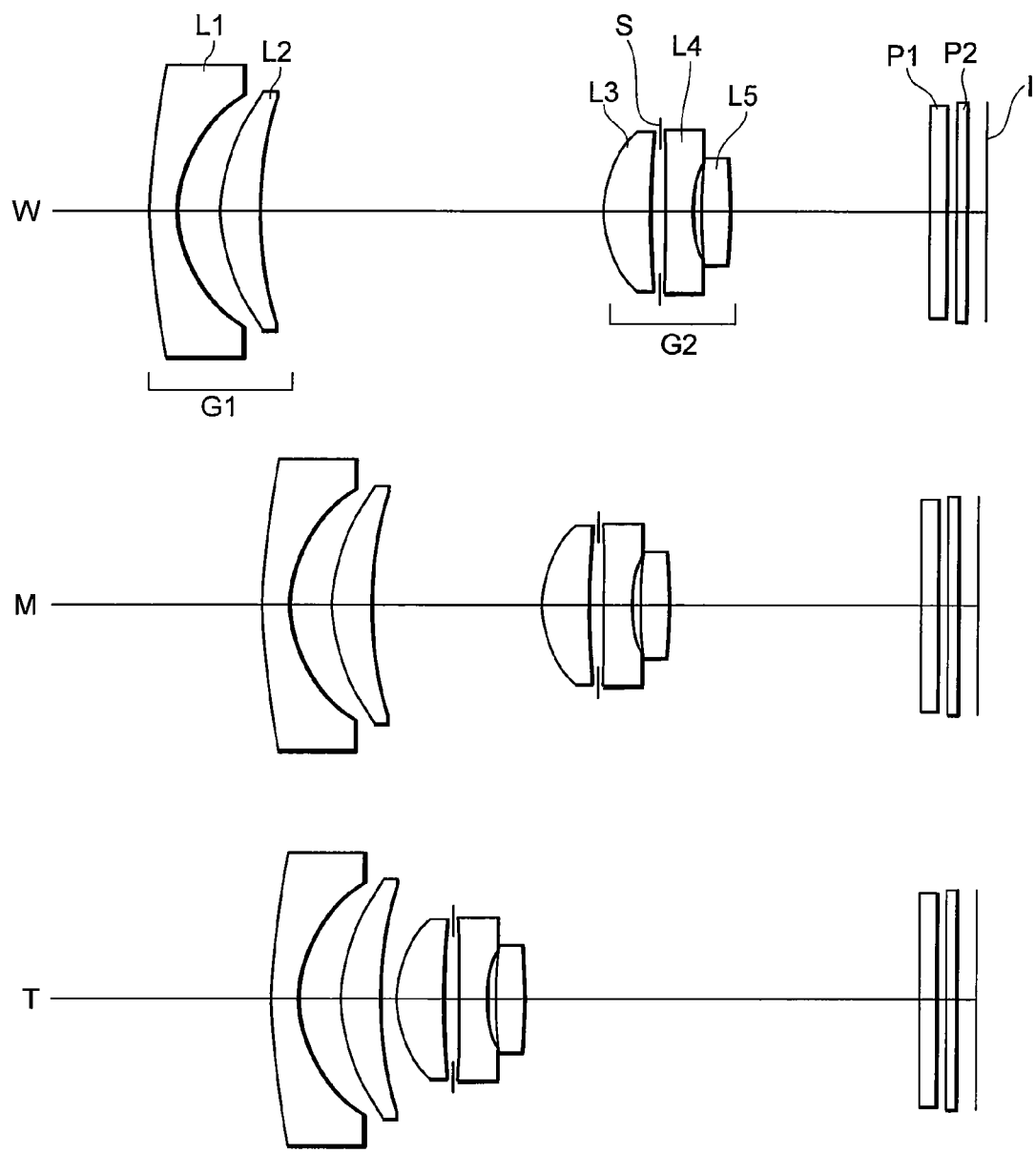
FIG. 11 is a diagram showing a lens configuration of a zoom lens system according to Example 5 of the present embodiment, in which W denotes a wide-angle end state, M denotes an intermediate focal length state, and T denotes a telephoto end state.

FIG. 11 is a diagram showing a lens configuration of a zoom lens system according to Example 5 of the present embodiment, in which W denotes a wide-angle end state, M denotes an intermediate focal length state, and T denotes a telephoto end state.

In FIG. 11, the zoom lens system according to Example 5 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a negative meniscus lens L1 having a convex surface facing the object, and a positive meniscus lens L2 having a convex surface facing the object.

The second lens group G2 having positive refractive power as a whole is composed of three lenses that are, in order from the object, a double convex positive lens L3, a double concave negative lens L4, and a double convex positive lens L5. Those three lenses are independently disposed with respective air spaces in between.

An aperture stop S for defining an f-number is disposed to the object side adjacent to the fourth lens L4, and moved together with the second lens group G2.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 5 are listed in Table 5.

TABLE 5

[Specifications]

| | W | M | T |
|---|---|---|---|
| f = | 5.87 | 9.0 | 16.6 |
| FNO = | 2.92 | 3.44 | 4.84 |
| 2ω = | 68.7° | 46.0° | 25.5° |
| Bf = | 0.37 (constant) | | |

[Lens Data]

| | r | d | νd | nd |
|---|---|---|---|---|
| 1 | 37.0598 | 1.0000 | 40.10 | 1.851350 |
| 2* | 4.9359 | 1.7500 | | |
| 3 | 7.8587 | 1.6000 | 23.78 | 1.846660 |
| 4 | 16.5416 | D4 | | |
| 5 | 4.6342 | 1.9000 | 53.31 | 1.693500 |
| 6* | −6517.4350 | 0.5500 | | |
| 7 | −70.0933 | 1.1000 | 23.78 | 1.846660 |
| 8 | 5.8445 | 0.3182 | | |
| 9 | 19.5418 | 1.1500 | 40.42 | 1.727600 |
| 10* | −11.2979 | D10 | | |
| 11 | 0.0000 | 0.6000 | 64.20 | 1.516800 |
| 12 | 0.0000 | 0.4000 | | |
| 13 | 0.0000 | 0.5000 | 64.20 | 1.516800 |
| 14 | 0.0000 | Bf | | |

TABLE 5-continued

[Aspherical Data]

Surface Number: 2

K = 0.1766
C4 = 4.21260E−04
C6 = 1.29760E−06
C8 = 1.88970E−07
C10 = −2.86990E−09
Surface Number: 6

K = 1.0000
C4 = 1.01780E−03
C6 = 1.11190E−05
C8 = −9.61610E−06
C10 = 5.59730E−07
Surface Number: 10

K = 12.2503
C4 = 1.80220E−03
C6 = 6.44670E−05
C8 = 3.26320E−05
C10 = 2.75600E−08

[Variable Distances]

|    | W        | M        | T        |
|----|----------|----------|----------|
| f  | 5.87000  | 9.00000  | 16.60000 |
| D0 | ∞        | ∞        | ∞        |
| D4 | 13.72252 | 6.61470  | 0.51181  |
| D10| 8.37518  | 10.63169 | 16.11076 |

[Values for Conditional Expressions]

(1): S2/fw = 0.855
(2): Δsag/fw = 0.198
(3): FNw × fw/(−f1) = 1.328
(4): Z × S1/S2 = 2.451
(5): G2β = −1.287
(6): TLw/f34 = −0.399
(7): fw/f45 = −0.622
(8): L1n = 1.85135

Figure 12A:
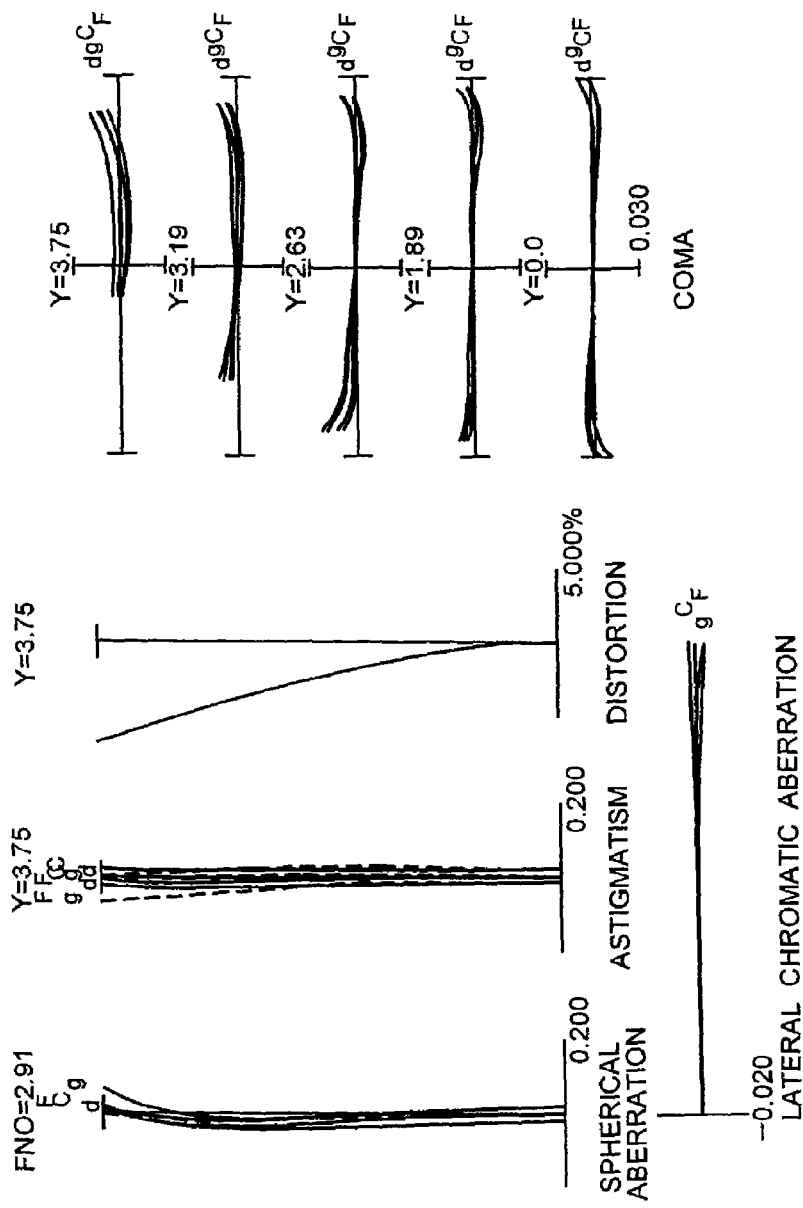
Figure 12B:
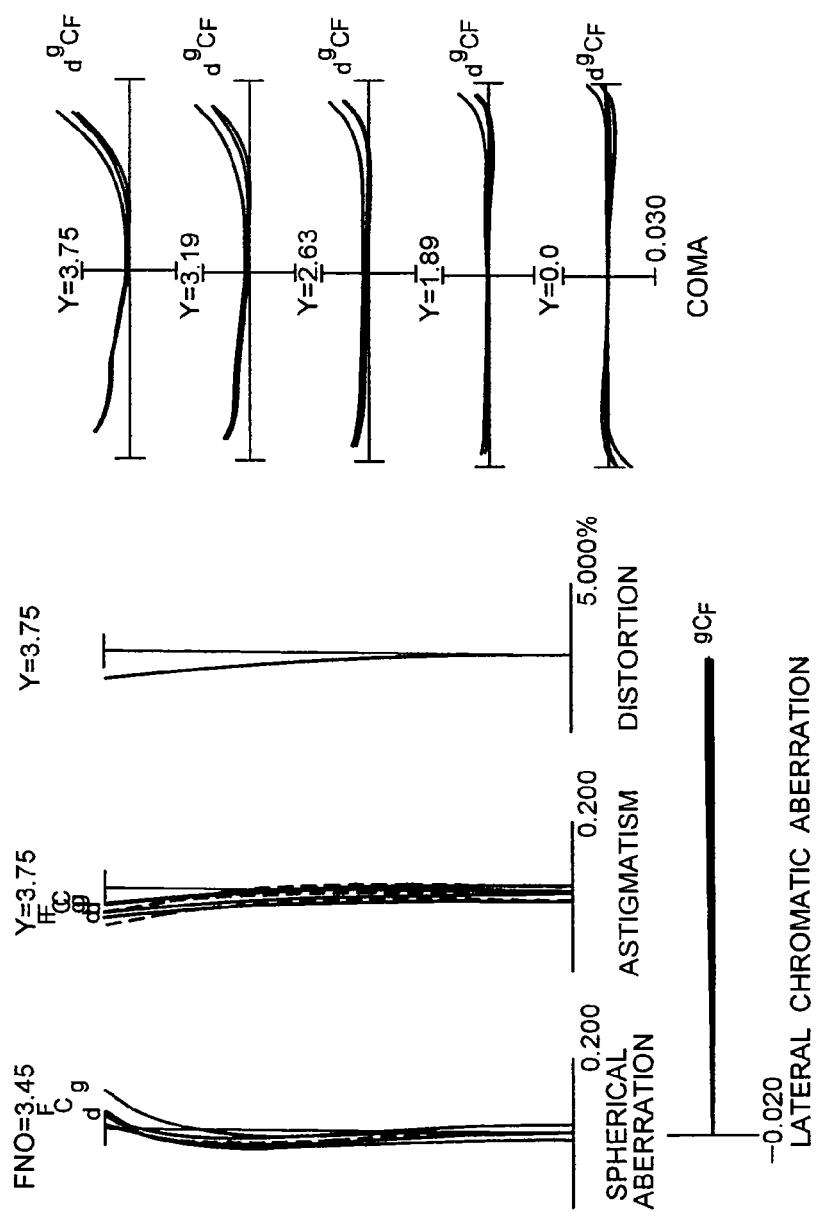
Figure 12C:
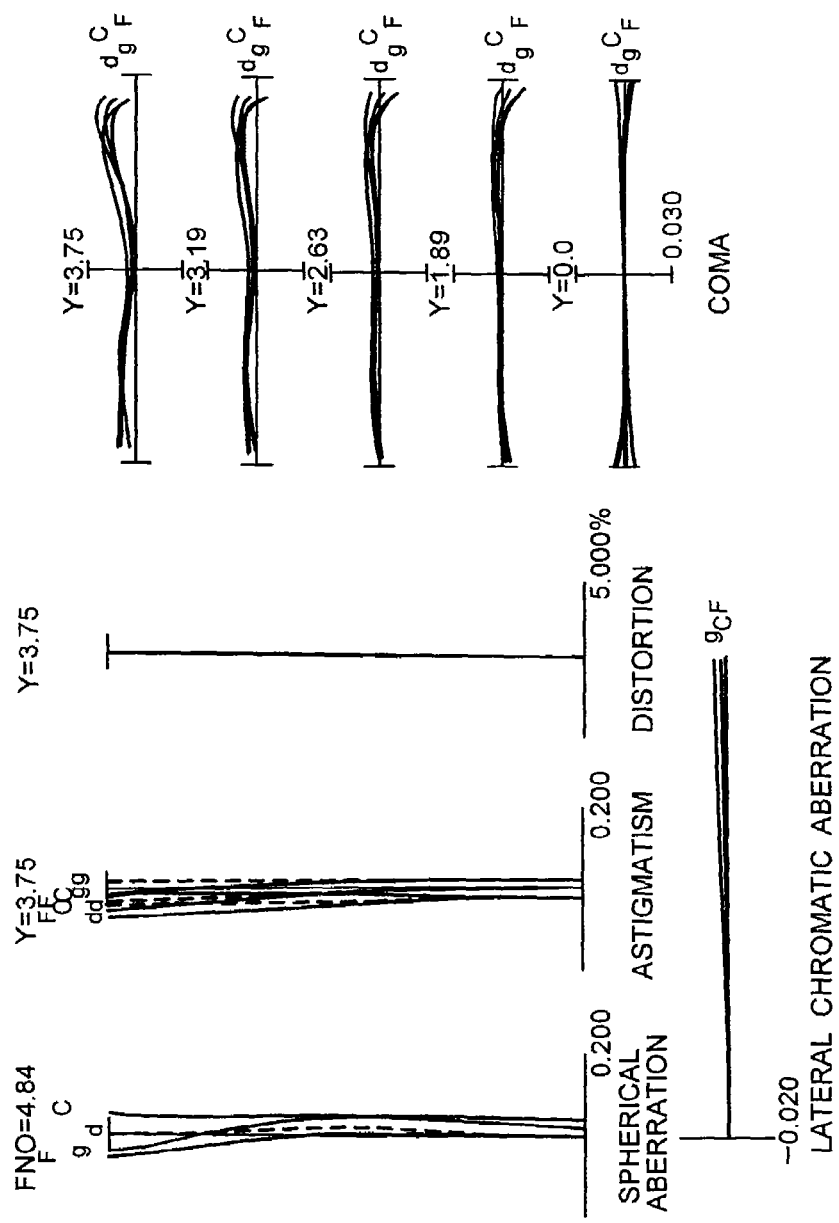

FIGS. 12A, 12B and 12C are graphs showing various aberrations of the zoom lens system according to Example 5 upon focusing on infinity, in which FIG. 12A shows a wide-angle end state, FIG. 12B shows an intermediate focal length state, and FIG. 12C shows a telephoto end state.

As is apparent from the respective graphs, the zoom lens system according to Example 5 shows superb optical performance as a result of good corrections to various aberrations over entire zoom range from the wide-angle end state W to the telephoto end state T even in the state upon shifting.

EXAMPLE 6

Figure 13:
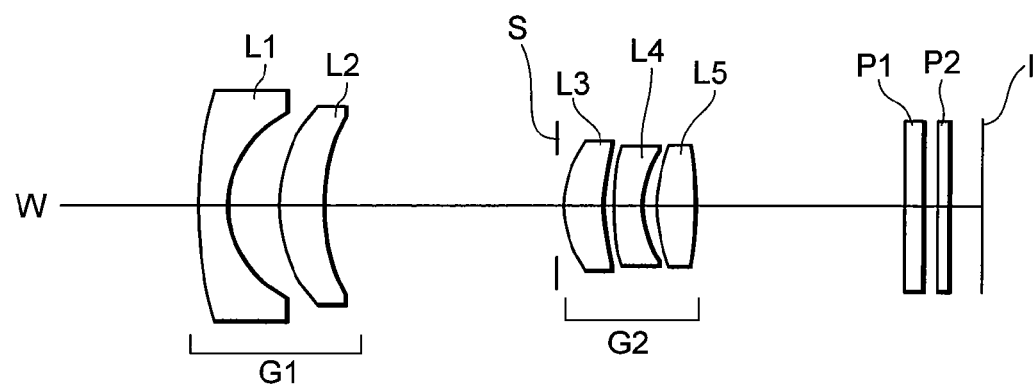
FIG. 13 is a diagram showing a lens configuration of a zoom lens system according to Example 6 of the present embodiment, in which W denotes a wide-angle end state, M denotes an intermediate focal length state, and T denotes a telephoto end state.
Figure 13:
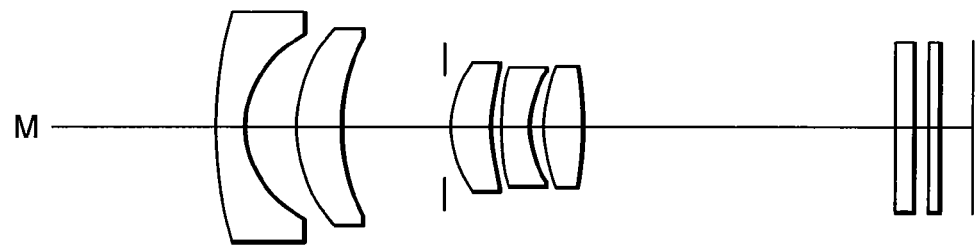
Figure 13:
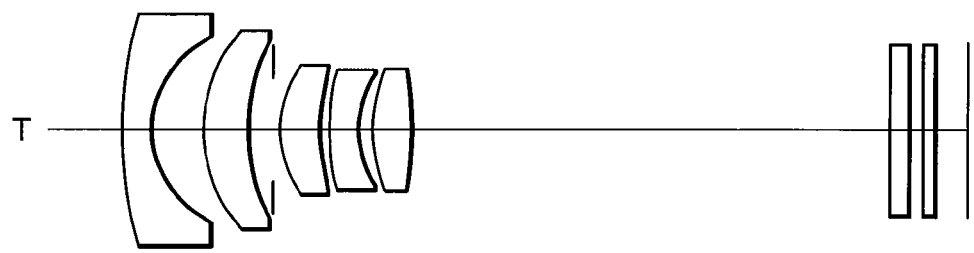

FIG. 13 is a diagram showing a lens configuration of a zoom lens system according to Example 6 of the present embodiment, in which W denotes a wide-angle end state, M denotes an intermediate focal length state, and T denotes a telephoto end state.

In FIG. 13, the zoom lens system according to Example 6 is composed of, in order from an object, a first lens group G1 having negative refractive power, and a second lens group G2 having positive refractive power. When a state of lens group positions varies from a wide-angle end state W to a telephoto end state T, the first lens group G1 and the second lens group G2 are moved along an optical axis such that a distance between the first lens group G1 and the second lens group G2 decreases.

The first lens group G1 having negative refractive power as a whole is composed of two lenses that are, in order from the object, a negative meniscus lens L1 having a convex surface facing the object, and a positive meniscus lens L2 having a convex surface facing the object.

The second lens group G2 having positive refractive power as a whole is composed of three lenses that are, in order from the object, a positive meniscus lens L3 having a convex surface facing the object, a negative meniscus lens L4 having a convex surface facing the object, and a double convex positive lens L5. Those three lenses are independently disposed with respective air spaces in between.

An aperture stop S for defining an f-number is disposed to the object side adjacent to the third lens L3, and moved together with the second lens group G2.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 6 are listed in Table 6.

TABLE 6

[Specifications]

|      | W      | M      | T      |
|------|--------|--------|--------|
| f =  | 5.3    | 9.0    | 15.0   |
| FNO =| 3.60   | 4.58   | 6.17   |
| 2ω = | 74.5°  | 46.4°  | 28.3°  |
| Bf = | 1.30828 (constant) | | |

[Lens Data]

|    | r        | d      | νd    | nd       |
|----|----------|--------|-------|----------|
| 1  | 17.4449  | 1.0000 | 45.60 | 1.755120 |
| 2* | 3.2739   | 1.8966 |       |          |
| 3* | 5.7432   | 1.6000 | 24.06 | 1.821140 |
| 4  | 7.9300   | D4     |       |          |
| 5  | 3.5757   | 1.4700 | 63.86 | 1.618810 |
| 6* | 13.2237  | 0.3136 |       |          |
| 7* | 9.4181   | 1.0000 | 25.43 | 1.805180 |
| 8  | 3.3532   | 0.5410 |       |          |
| 9  | 6.4560   | 1.4000 | 50.80 | 1.570990 |
| 10 | −10.2969 | D10    |       |          |
| 11 | 0.0000   | 0.7840 | 70.51 | 1.544370 |
| 12 | 0.0000   | 0.4000 |       |          |
| 13 | 0.0000   | 0.4000 | 64.14 | 1.516330 |
| 14 | 0.0000   | Bf     |       |          |

[Aspherical Data]

Surface Number: 2

K = 0.3700
C4 = 1.20240E−03
C6 = 2.48260E−05
C8 = 4.89150E−07
C10 = 1.54250E−07
Surface Number: 3

K = 1.3230
C4 = 1.10360E−04
C6 = 1.00000E−12
C8 = 1.49790E−07
C10 = 1.00000E−16
Surface Number: 6

K = 1.0927
C4 = −4.46250E−04
C6 = −1.14510E−04

TABLE 6-continued

```
C8 = 4.66280E−06
C10 = −2.38850E−06
Surface Number: 7

K = −1.0000
C4 = 2.15350E−03
C6 = −1.59980E−05
C8 = −8.91310E−07
C10 = 8.93630E−16
```

[Variable Distances]

| | W | M | T |
|---|---|---|---|
| f | 5.30000 | 9.00001 | 14.99999 |
| D0 | ∞ | ∞ | ∞ |
| D4 | 8.28586 | 3.59545 | 0.90798 |
| D10 | 7.40617 | 11.12892 | 17.16581 |

[Values for Conditional Expressions]

(1): S2/fw = 0.891
(2): Δsag/fw = 0.137
(3): FNw × fw/(−f1) = 2.464
(4): Z × S1/S2 = 2.694
(5): G2β = −1.935
(6): TLw/f34 = 1.123
(7): fw/f45 = −0.743
(8): L1n = 1.75512

Figure 14A:
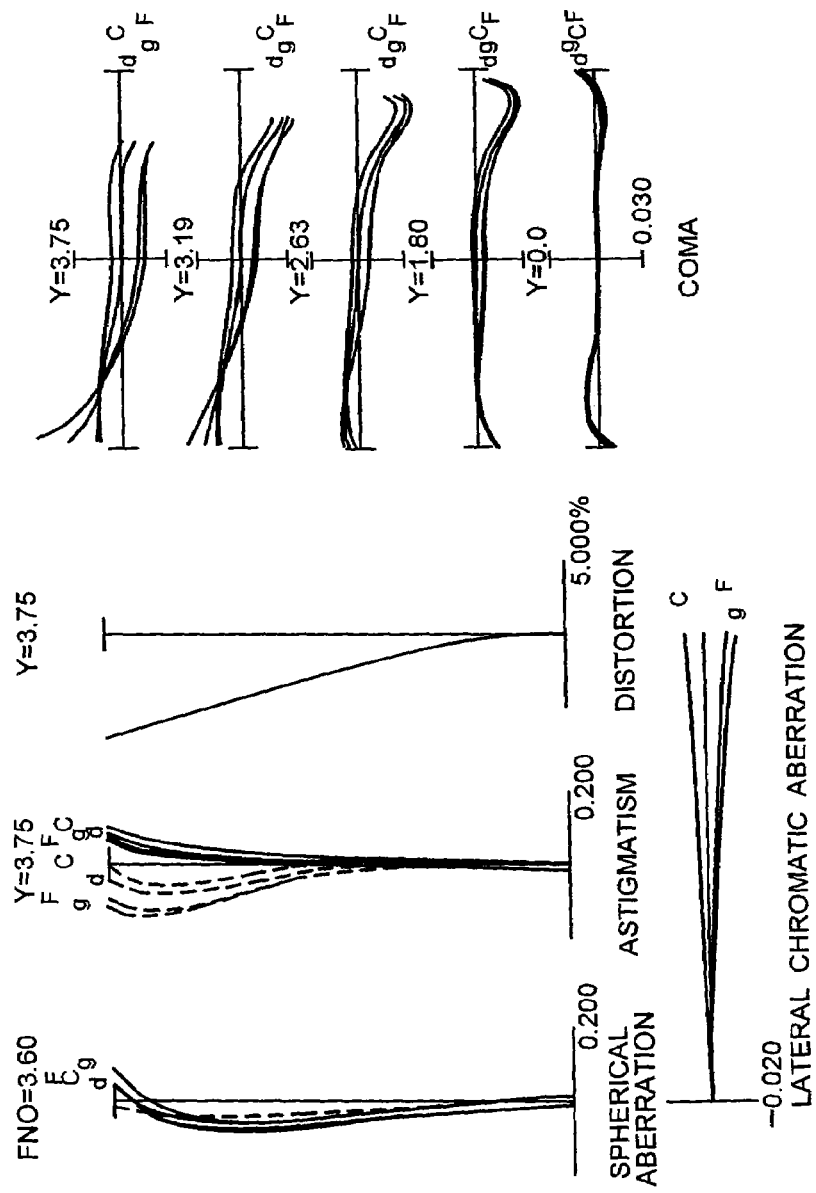
Figure 14B:
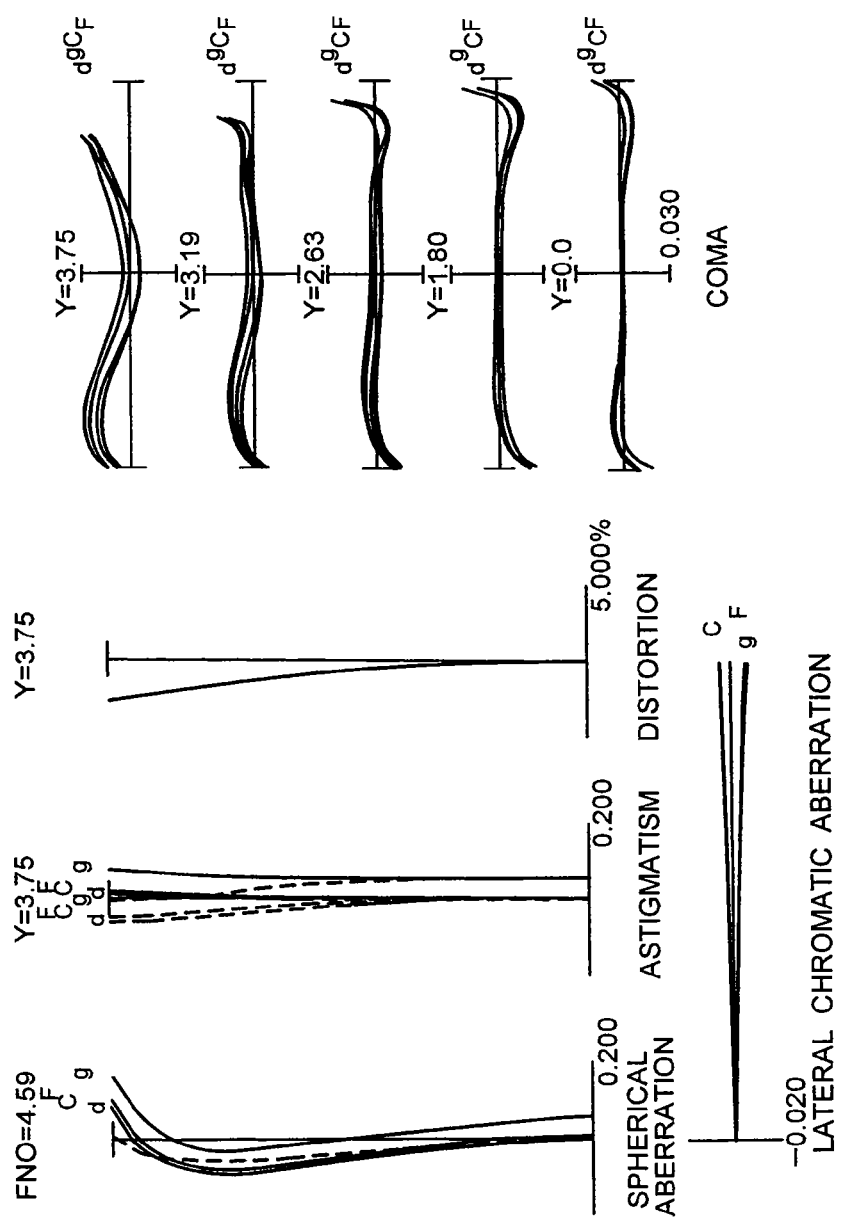
Figure 14C:
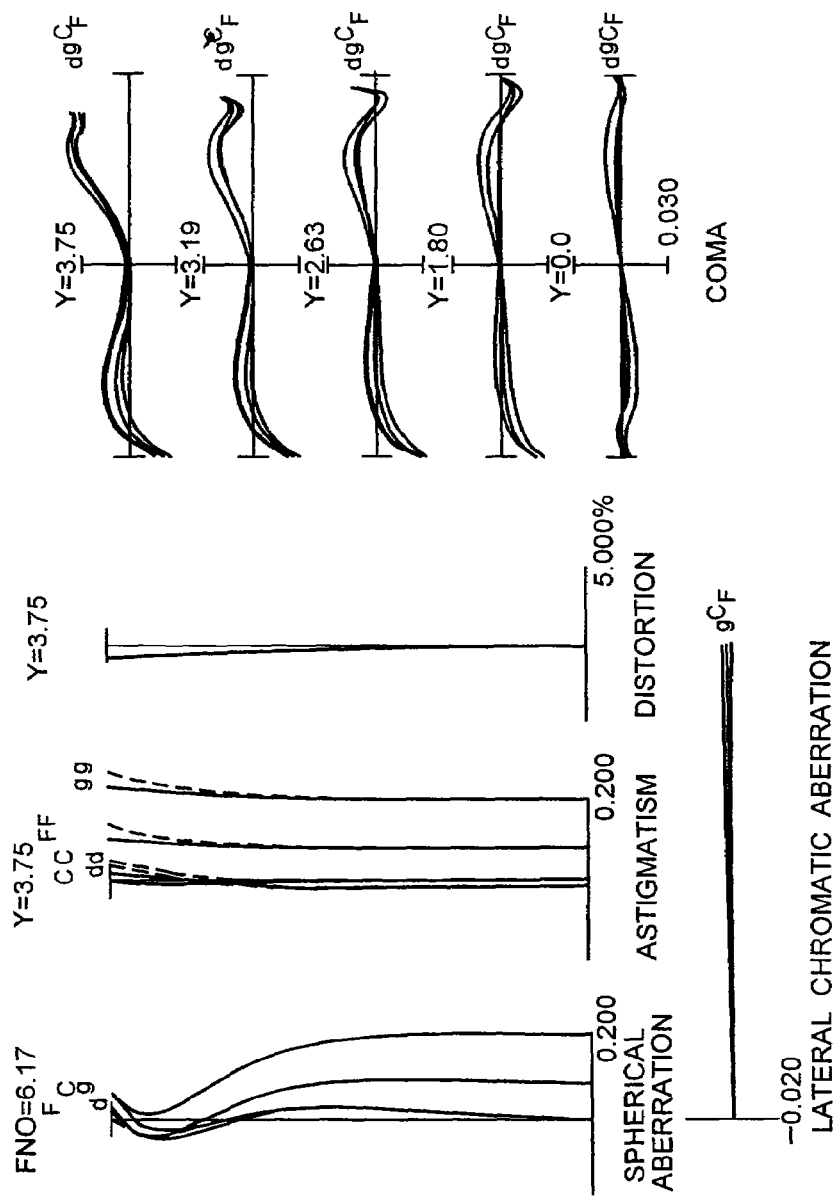

FIGS. 14A, 14B and 14C are graphs showing various aberrations of the zoom lens system according to Example 6 upon focusing on infinity, in which FIG. 14A shows a wide-angle end state, FIG. 14B shows an intermediate focal length state, and FIG. 14C shows a telephoto end state.

As is apparent from the respective graphs, the zoom lens system according to Example 6 shows superb optical performance as a result of good corrections to various aberrations over entire zoom range from the wide-angle end state W to the telephoto end state T even in the state upon shifting.

Incidentally, the following description may suitably be applied within limits that do not deteriorate optical performance.

In order to carry out focusing from infinity to a close-range object, a portion of a lens group, a single lens group, or a plurality of lens groups may be moved along the optical axis. The focusing lens group(s) may be used for auto focus, and suitable for being driven by a motor such as an ultrasonic motor. In a zoom lens system according to the present embodiment, the first lens group may preferably be used for the focusing lens group.

In a zoom lens system according to present embodiment, in order to correct an image blur caused by a camera shake, a portion of a lens group, or a single lens group may be shifted as a vibration reduction lens group in a direction perpendicular to the optical axis. In a zoom lens system according to present embodiment, it is preferable that the second lens group or a portion of the second lens group is used for the vibration reduction lens group by shifting in a direction substantially perpendicular to the optical axis. In view of manufacturing tolerance, it is preferable that the second lens group as a whole is shifted in a direction substantially perpendicular to the optical axis. In order to simplify the moving mechanism, it is preferable that only the third lens is shifted in a direction substantially perpendicular to the optical axis. In order to correct aberrations, it is preferable that only the fourth lens is shifted in a direction substantially perpendicular to the optical axis. In addition, it is possible to shift only the fifth lens, or the third lens and the fourth lens as a sub-lens-group.

Moreover, any lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass lens surface.

Moreover, although an aperture stop is preferably disposed in the vicinity of the second lens group, the function may be substituted by a lens frame without disposing a member as the aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A zoom lens system having only two lens groups, the two lens groups being, in order from an object:
   a first lens group having negative refractive power; and
   a second lens group having positive refractive power,
   wherein upon varying a state of lens group positions from a wide-angle end state to a telephoto end state, a distance between the first lens group and the second lens group decreases,
   the first lens group consisting of, in order from the object, a first lens having negative refractive power and a second lens having positive refractive power,
   the second lens group consisting of, in order from the object, a third lens having positive refractive power, a fourth lens having negative refractive power, and a fifth lens having positive refractive power,
   the third lens, the fourth lens, and the fifth lens being disposed with at least one air space in between, and
   the following conditional expression being satisfied:

$0.76 < S2/fw < 1.30$ where S2 denotes a thickness of the second lens group, and fw denotes a focal length of the zoom lens system in the wide-angle end state.

2. The zoom lens system according to claim 1, wherein the first lens has at least one aspherical surface.

3. The zoom lens system according to claim 2, wherein said one aspherical surface is disposed on an image side surface of the first lens.

4. The zoom lens system according to claim 1, wherein the third lens, the fourth lens, and the fifth lens are disposed with respective air spaces in between.

5. The zoom lens system according to claim 2, wherein said one aspherical surface satisfies the following conditional expression:

$0.10 < \Delta sag/fw < 0.50$ where $\Delta sag = XS(h) - X(h)$, in which sag amounts $XS(h)$ and $X(h)$ are denoted by the following spherical expression $XS(h)$ and aspherical expression $X(h)$ upon $y=h=0.85r$:

$$XS(y) = y^2/[r \times \{1+(1-y^2/r^2)^{1/2}\}]$$

$$X(y) = y^2/[r \times \{1+(1-k \times y^2/r^2)^{1/2}\}] + C4 \times y^4 + C6 \times y^6 + C8 \times y^8 + C10 \times y^{10}$$

where y denotes a vertical height from the optical axis, $X(y)$ denotes a sag amount which is a distance along the optical axis from the tangent surface at the vertex of the aspherical surface to the aspherical surface at the vertical height y from the optical axis, $XS(y)$ denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order, and where $X(y)$ and $XS(y)$ are positive toward the image.

6. The zoom lens system according to claim 1, wherein the following conditional expression is satisfied:

$$1.05 < FNw \times fw/(-f1) < 1.85$$

where FNw denotes an f-number of the zoom lens system in the wide-angle end state, and f1 denotes a focal length of the first lens group.

7. The zoom lens system according to claim 1, wherein the following conditional expression is satisfied:

$$1.85 < Z \times S1/S2 < 5.00$$

where S1 denotes a thickness of the first lens group, and Z denotes a zoom ratio of the zoom lens system.

8. The zoom lens system according to claim 1, wherein the following conditional expression is satisfied:

$$-2.5 < G2\beta < -1.10$$

where $G2\beta$ denotes a magnification of the second lens group in the telephoto end state.

9. The zoom lens system according to claim 1, wherein the following conditional expression is satisfied:

$$TLw/f34 < 2.90$$

where TLw denotes a total lens length of the zoom lens system in the wide-angle end state, and f34 denotes a focal length of an air distance between the image side surface of the third lens and the object side surface of the fourth lens, which is defined by the following expression:

$$(1/f34) = ((1-n3)/r3R) + ((n4-1)/r4F) + d34 \times ((1-n3)/r3R) \times ((n4-1)/r4F)$$

where r3R denotes a radius of curvature of the image side surface of the third lens, r4F denotes a radius of curvature of the object side surface of the fourth lens, n3 denotes refractive index of the third lens at d-line ($\lambda=587.6$ nm), n4 denotes refractive index of the fourth lens at d-line ($\lambda=587.6$ nm), and d34 denotes a distance between the image side surface of the third lens and the object side surface of the fourth lens.

10. The zoom lens system according to claim 1, wherein the following conditional expression is satisfied:

$$-1.10 < fw/f45$$

where f45 denotes a focal length of an air distance between the image side surface of the fourth lens and the object side surface of the fifth lens, which is defined by the following expression:

$$(1/f45) = ((1-n4)/r4R) + ((n5-1)/r5F) + d45 \times ((1-n4)/r4R) \times ((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line ($\lambda=587.6$ nm), n5 denotes refractive index of the fifth lens at d-line ($\lambda=587.6$ nm), and d45 denotes a distance between the image side surface of the fourth lens and the object side surface of the fifth lens.

11. The zoom lens system according to claim 1, wherein the following conditional expression is satisfied:

$$1.81 < L1n$$

where L1n denotes refractive index of the first lens at d-line ($\lambda=587.6$ nm).

12. The zoom lens system according to claim 1, wherein the third lens has at least one aspherical surface.

13. An optical apparatus using the zoom lens system according to claim 1.

14. The zoom lens system according to claim 1, wherein the following conditional expression is satisfied:

$$0.855 \leq s2/fw < 1.30.$$

15. The zoom lens system according to claim 1, wherein the following conditional expression is satisfied:

$$1.05 < FNw \times fw/(-f1) < 1.40$$

where FNw denotes an f-number of the zoom lens system in the wide-angle end state, and f1 denotes a focal length of the first lens group.

16. A method for varying a focal length of a zoom lens system, comprising:
   providing a zoom lens system having only two lens groups, the two lens groups being, in order from an object:
   a first lens group having negative refractive power, and
   a second lens group having positive refractive power,
   the first lens group consisting of, in order from the object, a first lens having negative refractive power, and a second lens having positive refractive power,
   the second lens group consisting of, in order from the object, a third lens having positive refractive power, a fourth lens having negative refractive power, and a fifth lens having positive refractive power, and
   the following conditional expression being satisfied:

$$1.05 < FNw \times fw/(-f1) < 1.85$$

where FNw denotes an f-number of the zoom lens system in the wide-angle end state, fw denotes a focal length of the zoom lens system in the wide-angle end state, and f1 denotes a focal length of the first lens group; and
   varying a focal length of the zoom lens system from a wide-angle end state to a telephoto end state by decreasing a distance between the first lens group and the second lens group.

17. The method according to claim 16, wherein the first lens group has at least one aspherical surface.

18. The method according to claim 17, wherein said one aspherical surface is disposed on the image side of the first lens.

19. The method according to claim 17, wherein said one aspherical surface satisfies the following conditional expression:

$$0.10 < \Delta sag/fw < 0.50$$

where $\Delta\text{sag}=XS(h)-X(h)$, in which sag amounts $XS(h)$ and $X(h)$ are denoted by the following spherical expression $XS(h)$ and aspherical expression $X(h)$ upon $y=h=0.85r$:

$$XS(y)=y^2/[r\times\{1+(1-y^2/r^2)^{1/2}\}]$$

$$X(y)=y^2/[r\times\{1+(1-Ky^2/r^2)^{1/2}\}]+C4\times y^4+C6\times y^6+C8\times y^8+C10\times y^{10}$$

where y denotes a vertical height from the optical axis, $X(y)$ denotes a sag amount which is a distance along the optical axis from the tangent surface at the vertex of the aspherical surface to the aspherical surface at the vertical height y from the optical axis, $XS(y)$ denotes a sag amount which is a distance along the optical axis from the tangent surface at the vertex of the reference sphere at the vertical height y from the optical axis, r denotes a radius of curvature of a reference sphere (paraxial radius of curvature), K denotes a conical coefficient, and Cn denotes aspherical coefficient of n-th order, and where $X(y)$ and $XS(y)$ are positive toward the image.

20. The method according to claim 16, wherein the third lens, the fourth lens, and the fifth lens are disposed with respective air spaces in between.

21. The method according to claim 16, wherein the third lens has at least one aspherical surface.

22. The method according to claim 16, wherein the third lens, the fourth lens, and the fifth lens are disposed with at least one air space in between.

23. A method for varying a focal length of a zoom lens system, comprising:
  providing a zoom lens system having only two lens groups, the two lens groups being, in order from an object:
  a first lens group having negative refractive power, and
  a second lens group having positive refractive power,
  the first lens group consisting of, in order from the object, a first lens having negative refractive power, and a second lens having positive refractive power,
  the second lens group consisting of, in order from the object, a third lens having positive refractive power, a fourth lens having negative refractive power, and a fifth lens having positive refractive power, and
  the following conditional expression being satisfied:

$$1.85 < Z \times S1/S2 < 5.00$$

where S1 denotes a thickness of the first lens group, S2 denotes a thickness of the second lens group, and Z denotes a zoom ratio of the zoom lens system; and
  varying a focal length of the zoom lens system from a wide-angle end state to a telephoto end state by decreasing a distance between the first lens group and the second lens group.

24. A method for varying a focal length of a zoom lens system, comprising:
  providing a zoom lens system having only two lens groups, the two lens groups being, in order from an object:
  a first lens group having negative refractive power, and
  a second lens group having positive refractive power,
  the first lens group consisting of, in order from the object, a first lens having negative refractive power, and a second lens having positive refractive power,
  the second lens group consisting of, in order from the object, a third lens having positive refractive power, a fourth lens having negative refractive power, and a fifth lens having positive refractive power, and
  the following conditional expression being satisfied:

$$-2.5 < G2\beta < -1.10$$

where $G2\beta$ denotes a magnification of the second lens group in the telephoto end state; and
  varying a focal length of the zoom lens system from a wide-angle end state to a telephoto end state by decreasing a distance between the first lens group and the second lens group.

25. A method for varying a focal length of a zoom lens system, comprising:
  providing a zoom lens system having only two lens groups, the two lens groups being, in order from an object:
  a first lens group having negative refractive power, and
  a second lens group having positive refractive power,
  the first lens group consisting of, in order from the object, a first lens having negative refractive power, and a second lens having positive refractive power,
  the second lens group consisting of, in order from the object, a third lens having positive refractive power, a fourth lens having negative refractive power, and a fifth lens having positive refractive power, and
  the following conditional expression being satisfied:

$$TLw/f34 < 2.90$$

where TLw denotes a total lens length of the zoom lens system in the wide-angle end state, and f34 denotes a focal length of an air distance between the image side surface of the third lens and the object side surface of the fourth lens, which is defined by the following expression:

$$(1/f34)=((1-n3)/r3R)+((n4-1)/r4F)+d34\times((1-n3)/r3R)\times((n4-1)/r4F)$$

where r3R denotes a radius of curvature of the image side surface of the third lens, r4F denotes a radius of curvature of the object side surface of the fourth lens, n3 denotes refractive index of the third lens at d-line ($\lambda=587.6$ nm), n4 denotes refractive index of the fourth lens at d-line ($\lambda=587.6$ nm), and d34 denotes a distance between the image side surface of the third lens and the object side surface of the fourth lens; and
  varying a focal length of the zoom lens system from a wide-angle end state to a telephoto end state by decreasing a distance between the first lens group and the second lens group.

26. A method for varying a focal length of a zoom lens system, comprising:
  providing a zoom lens system having only two lens groups, the two lens groups being, in order from an object:
  a first lens group having negative refractive power, and
  a second lens group having positive refractive power,
  the first lens group consisting of, in order from the object, a first lens having negative refractive power, and a second lens having positive refractive power,
  the second lens group consisting of, in order from the object, a third lens having positive refractive power, a fourth lens having negative refractive power, and a fifth lens having positive refractive power, and
  the following conditional expression being satisfied:

$$-1.10 < fw/f45$$

where fw denotes a focal length of the zoom lens system in the wide-angle end state, and f45 denotes a focal length of an air distance between the image side surface of the fourth lens and the object side surface of the fifth lens, which is defined by the following expression:

$$(1/f45)=((1-n4)/r4R)+((n5-1)/r5F)+d45\times((1-n4)/r4R)\times((n5-1)/r5F)$$

where r4R denotes a radius of curvature of the image side surface of the fourth lens, r5F denotes a radius of curvature of the object side surface of the fifth lens, n4 denotes refractive index of the fourth lens at d-line (λ=587.6 nm), n5 denotes refractive index of the fifth lens at d-line (λ=587.6 nm), and d45 denotes a distance between the image side surface of the fourth lens and the object side surface of the fifth lens; and varying a focal length of the zoom lens system from a wide-angle end state to a telephoto end state by decreasing a distance between the first lens group and the second lens group.

27. A method for varying a focal length of a zoom lens system, comprising:

providing a zoom lens system having only two lens groups, the two lens groups being, in order from an object:

a first lens group having negative refractive power, and a second lens group having positive refractive power, the first lens group consisting of, in order from the object, a first lens having negative refractive power, and a second lens having positive refractive power, the second lens group consisting of, in order from the object, a third lens having positive refractive power, a fourth lens having negative refractive power, and a fifth lens having positive refractive power, and the following conditional expression being satisfied:

$$1.81 < L1n$$

where $L1n$ denotes refractive index of the first lens at d-line (λ=587.6 nm); and varying a focal length of the zoom lens system from a wide-angle end state to a telephoto end state by decreasing a distance between the first lens group and the second lens group.

* * * * *